United States Patent
Hanssen et al.

(10) Patent No.: US 9,555,978 B1
(45) Date of Patent: Jan. 31, 2017

(54) SEMI-AUTOMATED INVENTORY TRANSFER STATION

(71) Applicant: Amazon Technologies, Inc., Seattle, WA (US)

(72) Inventors: Erik Clement Hanssen, Seattle, WA (US); Jayson Michael Jochim, Seattle, WA (US); Brent Alan Hill, Seattle, WA (US); David Dickman Wong, Tacoma, WA (US); Dawn Cecelia Ferraro, Bonney Lake, WA (US); James Byron Hanson, Covington, WA (US); Maria Rebecca St. Vincent, Puyallup, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/723,375

(22) Filed: May 27, 2015

(51) Int. Cl.
*B65G 47/52* (2006.01)
*B65G 47/04* (2006.01)
*B65G 47/34* (2006.01)

(52) U.S. Cl.
CPC .............. *B65G 47/52* (2013.01); *B65G 47/04* (2013.01); *B65G 47/34* (2013.01); *B65G 2201/0235* (2013.01)

(58) Field of Classification Search
CPC ......... B65G 47/04; B65G 47/52; B65G 47/34; B65G 2201/0235; B65G 1/06; B65G 1/12; B65G 1/1373
See application file for complete search history.

(56) References Cited

U.S. PATENT DOCUMENTS

| | | | |
|---|---|---|---|
| 8,086,345 B2 * | 12/2011 | Pandit | G06Q 10/08 414/788 |
| 8,280,547 B2 | 10/2012 | D'Andrea et al. | |
| 8,855,806 B2 * | 10/2014 | Hara | G06Q 10/08 700/216 |
| 8,892,240 B1 * | 11/2014 | Vliet | B65G 1/1378 700/213 |
| 8,952,284 B1 * | 2/2015 | Wong | B07C 5/3412 209/586 |
| 9,009,072 B2 | 4/2015 | Wilson et al. | |

(Continued)

OTHER PUBLICATIONS

U.S. Appl. No. 14/723,386, filed May 27, 2015, Titled: Semi-Automated Inventory Transfer Station Output Merge Logic.

*Primary Examiner* — Kaitlin Joerger
(74) *Attorney, Agent, or Firm* — Kilpatrick Townsend & Stockton LLP

(57) ABSTRACT

An inventory transfer station is provided in connection with a workspace of an inventory management system. At the inventory transfer station, items are transferred from container holders to empty containers thereby generating containers that may fulfill orders for items. The inventory transfer station may be semi-automatically configured to transfer items from the container holders to the empty containers utilizing a vertical reciprocating conveyor that feeds empty containers to the inventory transfer station via an inbound conveyor lane associated with the inventory management system. Containers that have received items from the container holder may be transferred to an outbound conveyor lane that may, via the vertical reciprocating conveyor, feed fulfilled containers to a shipping area of the workspace.

20 Claims, 12 Drawing Sheets

(56) References Cited

U.S. PATENT DOCUMENTS

| | | | | |
|---|---|---|---|---|
| 9,014,844 B2* | 4/2015 | Casey | ............... | B65G 57/302 |
| | | | | 700/217 |
| 9,315,323 B2* | 4/2016 | Schubilske | .......... | B65G 1/1376 |
| 2009/0000912 A1* | 1/2009 | Battles | ............... | B65G 1/1371 |
| | | | | 198/431 |
| 2009/0299521 A1 | 12/2009 | Hansl et al. | | |
| 2012/0143427 A1 | 6/2012 | Hoffman et al. | | |
| 2013/0302132 A1* | 11/2013 | D'Andrea | ............. | G06Q 10/08 |
| | | | | 414/807 |
| 2014/0100999 A1* | 4/2014 | Mountz | ............... | G06Q 10/087 |
| | | | | 705/28 |
| 2014/0178161 A1* | 6/2014 | Moosburger | ......... | B65G 1/1378 |
| | | | | 414/273 |
| 2016/0009493 A1* | 1/2016 | Stevens | ............... | B65G 1/1373 |
| | | | | 700/216 |
| 2016/0101940 A1* | 4/2016 | Grinnell | ............... | B65G 1/1373 |
| | | | | 700/216 |
| 2016/0107838 A1* | 4/2016 | Swinkels | ............... | B66F 9/063 |
| | | | | 414/273 |

* cited by examiner

SEMI-AUTOMATED INVENTORY TRANSFER STATION

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

Figure 1:
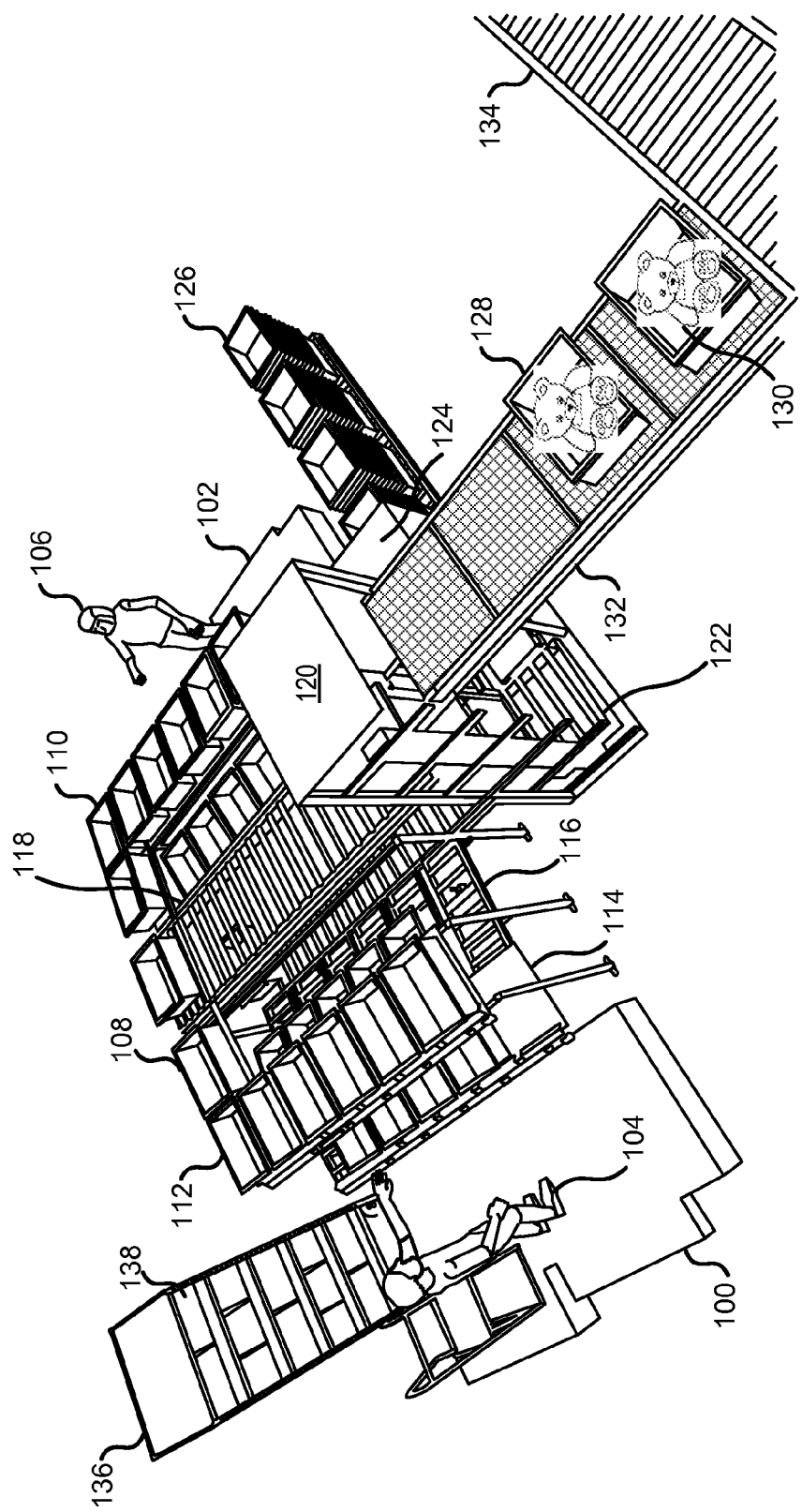
FIG. 1 illustrates example inventory transfer stations for moving inventory within an inventory management system as described herein, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory management system having multiple container holders and drive units for moving the container holders. Specifically, features herein are directed to managing the transfer of inventory at inventory transfer stations within the inventory management system. The container holders may include one or more containers configured to hold items within the inventory management system. Unmanned mobile drive units are provided to move the container holders among one or more locations of a facility (e.g., a warehouse) such as to one or more inventory transfer stations (e.g., item pick stations) within the inventory management system. The container holders may operate within a storage area of the facility and hold inventory items (within the containers) going to or coming from the storage area. The container holders may be placed in the storage area next to other container holders to form one or more rows of dense storage. The facility may include an inventory processing area which includes those areas where inventory is processed (e.g., receiving areas, picking areas, stowing areas, packing areas, shipping areas, consolidation areas, quality control areas, and any other suitable areas within the facility). The inventory transfer stations may be located in the inventory processing area for processing inventory within the facility. The inventory processing area may be separate from the storage area. The facility may generally operate at full capacity meaning that the location and configuration of the inventory transfer stations enable efficient use of the space available within the facility and/or the inventory processing area. To this end, two or more inventory transfer stations may be adjacently configured to interact with a centralized conveyor system that both semi-automatically provides empty containers for the fulfillment of orders for items, stowing of items in containers for movement to other areas of the facility (consolidation), or transfer of inventory from one facility to another, by an operator who transfers inventory from container holders that are provided by an unmanned mobile drive unit, and transfers fulfilled containers (containers with items) to a shipping area or other area of the facility. Each inventory transfer station may include a two tier container staging area: an upper tier for temporarily storing inbound empty containers into which items may be placed and, a lower tier for temporarily storing inbound empty containers into which items may be placed and for transfer of fulfilled containers to an accumulation area. The two tier container staging area may be coupled with an inbound conveyor lane (for semi-automatically providing empty containers) and an outbound conveyor lane (for semi-automatically transferring fulfilled containers to other areas of the facility). In embodiments, the container staging area may include only one or more than two tiers, and each tier may include any number of item transfer lanes to receive empty containers and items to be placed therein. An elevator assembly may be coupled with the conveyor lanes that utilizes a vertical reciprocating conveyor (VRC) to move empty containers to the inbound conveyor lane and fulfilled containers to the outbound conveyor lane. Instructions may be provided, and logic determined for a release sequence of fulfilled containers from the accumulation area to the outbound conveyor lane, by a management module that is communication with each inventory transfer station and unmanned mobile drive unit, as well as other associated upstream or downstream components and processes, within the inventory management system to transfer empty containers, fulfilled containers, and inventory as described herein. The use of semi-automated adjacent/parallel/mirrored inventory transfer stations within the inventory management system may improve efficiency of movement of inventory within the inventory management system and improve ergonomics at each station for operators processing inventory at the stations. This may include allowing the inventory management system to operate at maximum capacity.

In one example, two or more inventory transfer stations may be adjacent to each other and located within a facility. The inventory transfer stations are a physical location where inventory may be transferred from container holders to empty containers, e.g., for item order processing or from fulfilled containers to the container holders, e.g., for storage. Each inventory transfer station therefore includes a two tier container staging area coupled with inbound and outbound conveyor lanes. The conveyor lanes and two tier container staging area for each station may be coupled with an elevator assembly that includes a container de-stacker for semi-automatically feeding empty containers to each station and a VRC for transferring the empty containers to the inbound conveyor lane and fulfilled containers from the outbound conveyor lane to another area of the facility, such as a shipping area. An operator is located at each station and receives instructions via a user device regarding which containers to pick inventory from and where to place said inventory to create fulfilled containers. For example, in response to receiving a customer order for an item, a container holder, which includes a number of containers, is moved by an unmanned mobile drive unit from a storage area to a particular inventory transfer station within the facility. One of the containers of the container holder includes the item associated with the customer order (i.e., an outbound item). Meanwhile, the elevator assembly, VRC, and inbound conveyor lane transfer empty containers to the two tier container staging area where the operator will transfer an empty container to one of the upper tier or the lower tier of the two tier container staging area. The operator may remove inventory from a particular container of the container holder and place the inventory in the empty container in the upper or lower tier in response to information provided by the user device that corresponds to the customer order. The operator may then transfer the fulfilled container, such as by transferring and/or physically pushing the container, to an accumulation area that is coupled to the lower tier. Fulfilled containers may be temporarily held in the accumulation area until merging logic has been determined and provided by a management module that is in communication with each inventory transfer station. Upon receiving instructions from the management module, the accumulation areas of the two stations may release or merge various fulfilled containers to the outbound conveyor lane according to the determined merging logic. The accumulation areas may temporarily hold and release the fulfilled containers via a lock mechanism in communication with an actuator. In this manner, inventory associated with customer item orders may be efficiently processed via the semi-automatic inventory transfer station, while maximizing the space of the facility and improving the ergonomics at each station for the operators.

Turning now to the figures, FIG. 1 illustrates example inventory transfer stations for moving inventory within an inventory management system, in accordance with at least one embodiment. FIG. 1 includes two inventory transfer stations (item pick stations) 100 and 102 in an adjacent configuration that are operated by two operators 104 and 106. Each station 100 and 102 includes a two tier container staging area 108 and 110 that includes an upper tier 112 and a lower tier 114. It should be noted that the operator can be a human, or any automated or semi-automated machinery robot operator. The lower tier is coupled to an accumulation area 116 for temporarily storing fulfilled containers transferred from the lower tier before merging to an outbound conveyor lane (pictured below inbound conveyor lane 118 without an identifier for image clarity). The stations 100 and 102, and therefore the staging areas 108 and 110, are coupled with an elevator assembly 120 via the inbound conveyor lane 118 and outbound conveyor lane. The elevator assembly 120 may include a VRC 122 and a container de-stacker 124. As described herein, the elevator assembly 120, VRC 122, and container de-stacker 124 may be configured to semi-automatically single out and provide empty containers 126 to each staging area 108 and 110 via the inbound conveyor lane 118 and transfer fulfilled containers 128 (with inventory 130) to a shipping area of the facility via the outbound conveyor lane and trunk lines 132 and 134.

In an embodiment, as a customer order for an item is received, instructions may be provided to an unmanned mobile drive unit (not pictured) to move a particular container holder 136 to station 100 for processing by operator 104. The container holder 136 may include one or more containers 138 that include inventory, such as inventory 130, that may be transferred by operator 104 to fulfill the customer order. Upon the operator 104 placing inventory in a previously empty container in the upper or lower tiers 112, 114, the operator 104 may transfer the now fulfilled container to the accumulation area 116. The accumulation area 116 may utilize a lock mechanism coupled with an actuator to temporarily store the fulfilled containers before instructions are received to merge the fulfilled containers from both stations 100 and 102 to the outbound conveyor lane. As described herein, a management module (not pictured) in communication with stations 100 and 102 may determine merging logic for the fulfilled containers and provide appropriate instructions to the various actuators to release and merge the fulfilled containers in accordance with the determined merging logic to provide efficient transfer of the fulfilled containers to the elevator assembly 120, VRC 122, and trunk lines 132 and 134 to be transferred to any subsequent components, processes, or stations. The adjacent or parallel configuration of inventory transfer stations 100 and 102 coupled with the elevator assembly 120 and conveyor lanes 118 maximize the use of space within the facility while increasing the efficiency of fulfilling customer orders by semi-automatically providing empty containers, removing fulfilled containers, and determining merging logic to maximize the use of a single outbound conveyor lane that is coupled to two inventory transfer stations.

Figure 2:
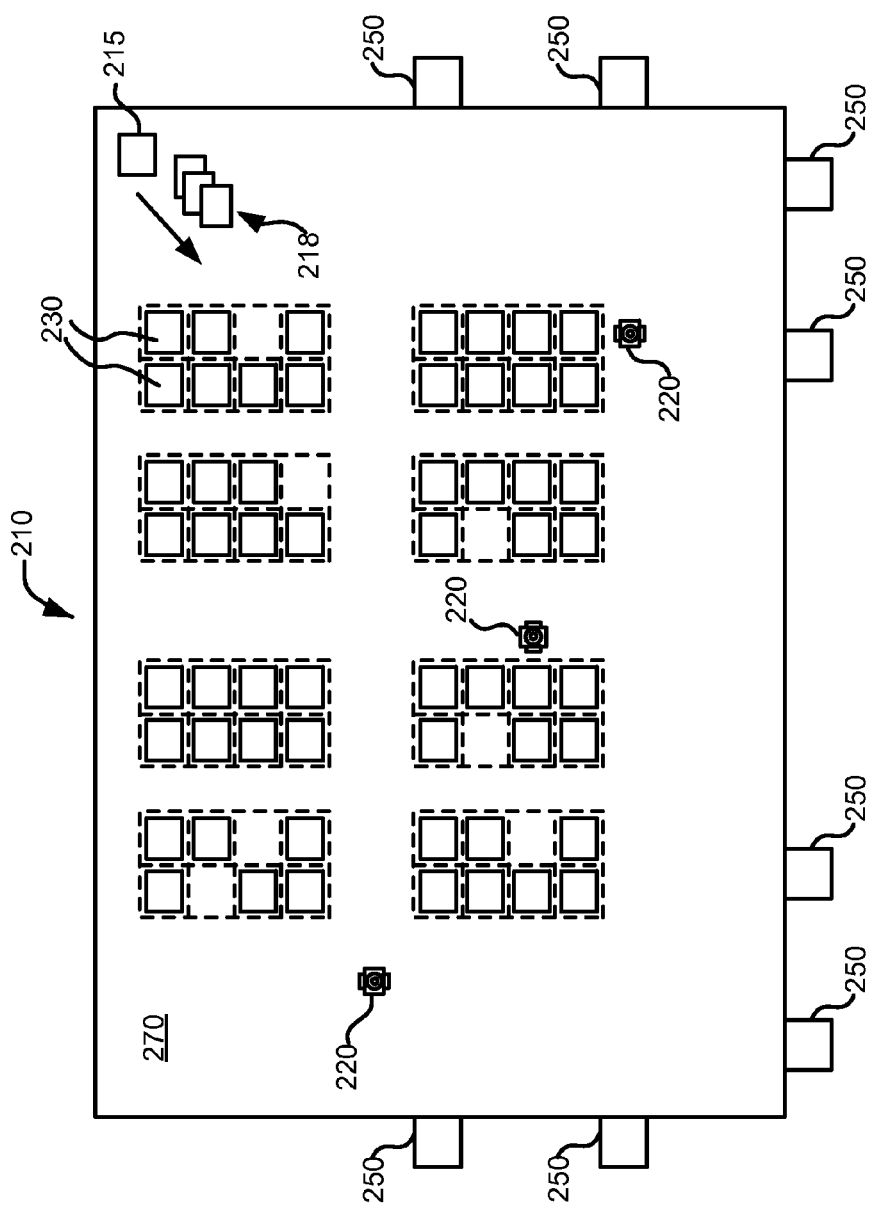
FIG. 2 illustrates components of an inventory management system, in accordance with at least one embodiment.

FIG. 2 illustrates the components of an inventory management system 210. Inventory management system 210 includes a management module 215, one or more mobile drive units 220, one or more inventory holders 230, and one or more inventory stations 250. Mobile drive units 220 transport inventory holders 230 between points within a workspace 270 in response to commands communicated by management module 215. Each inventory holder 230 stores one or more types of inventory items. As a result, inventory management system 210 is capable of moving inventory items between locations within workspace 270 to facilitate the entry, processing, and/or removal of inventory items from inventory management system 10 and the completion of other tasks involving inventory items.

Management module 215 assigns tasks to appropriate components of inventory management system 210 and coordinates operation of the various components in completing the tasks. These tasks may relate not only to the movement and processing of inventory items, but also to the management and maintenance of the components of inventory management system 210. For example, management module 215 may assign portions of workspace 270 as parking spaces for mobile drive units 220, the scheduled recharge or replacement of mobile drive unit batteries, the storage of empty inventory holders 230, or any other operations associated with the functionality supported by inventory management system 210 and its various components. Management module 215 may select components of inventory management system 210 to perform these tasks and communicate appropriate commands and/or data to the selected components to facilitate completion of these operations. Although shown in FIG. 2 as a single, discrete component, management module 215 may represent multiple components and may represent or include portions of mobile drive units 220 or other elements of inventory management system 210. As a result, any or all of the interaction between a particular mobile drive unit 220 and management module 215 that is described herein may, in particular embodiments, represent peer-to-peer communication between that mobile drive unit 220 and one or more other mobile drive units 220. The components and operation of an example embodiment of management module 215 are discussed further below with respect to FIG. 3.

Mobile drive units 220 move inventory holders 230 between locations within workspace 270. Mobile drive units 220 may represent any devices or components appropriate for use in inventory management system 210 based on the characteristics and configuration of inventory holders 230 and/or other elements of inventory management system 210. In a particular embodiment of inventory management system 210, mobile drive units 220 represent independent, self-powered devices configured to freely move about workspace 270. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 220 represent elements of a tracked inventory management system configured to move inventory holder 230 along tracks, rails, cables, crane system, or other guidance or support elements traversing workspace 270. In such an embodiment, mobile drive units 220 may receive power and/or support through a connection to the guidance elements, such as a powered rail. Additionally, in particular embodiments of inventory management system 210 mobile drive units 220 may be configured to utilize alternative conveyance equipment to move within workspace 270 and/or between separate portions of workspace 270.

Additionally, mobile drive units 220 may be capable of communicating with management module 215 to receive information identifying selected inventory holders 230, transmit the locations of mobile drive units 220, or exchange any other suitable information to be used by management module 215 or mobile drive units 220 during operation. Mobile drive units 220 may communicate with management module 215 wirelessly, using wired connections between mobile drive units 220 and management module 215, and/or in any other appropriate manner. As one example, particular embodiments of mobile drive unit 220 may communicate with management module 215 and/or with one another using 802.11, Bluetooth, or Infrared Data Association (IrDA) standards, or any other appropriate wireless communication protocol. As another example, in a tracked inventory management system 210, tracks or other guidance elements upon which mobile drive units 220 move may be wired to facilitate communication between mobile drive units 220 and other components of inventory management system 210. Furthermore, as noted above, management module 215 may include components of individual mobile drive units 220. Thus, for the purposes of this description and the claims that follow, communication between management module 215 and a particular mobile drive unit 220 may represent communication between components of a particular mobile drive unit 220. In general, mobile drive units 220 may be powered, propelled, and controlled in any manner appropriate based on the configuration and characteristics of inventory management system 210.

Inventory holders 230 store inventory items. In a particular embodiment, inventory holders 230 include multiple storage bins with each storage bin capable of holding one or more types of inventory items. Inventory holders 230 are capable of being carried, rolled, and/or otherwise moved by mobile drive units 220. In particular embodiments, inventory holder 230 may provide additional propulsion to supplement that provided by mobile drive unit 220 when moving inventory holder 230.

Additionally, in particular embodiments, inventory items may also hang from hooks or bars (not shown) within or on inventory holder 230. In general, inventory holder 230 may store inventory items in any appropriate manner within inventory holder 230 and/or on the external surface of inventory holder 230.

Additionally, each inventory holder 230 may include a plurality of faces, and each bin may be accessible through one or more faces of the inventory holder 230. For example, in a particular embodiment, inventory holder 230 includes four faces. In such an embodiment, bins located at a corner of two faces may be accessible through either of those two faces, while each of the other bins is accessible through an opening in one of the four faces. Mobile drive unit 220 may be configured to rotate inventory holder 230 at appropriate times to present a particular face and the bins associated with that face to an operator or other components of inventory management system 210.

Inventory items represent any objects suitable for storage, retrieval, and/or processing in an automated inventory management system 210. For the purposes of this description, "inventory items" may represent any one or more objects of a particular type that are stored in inventory management system 210. Thus, a particular inventory holder 230 is currently "storing" a particular inventory item if the inventory holder 230 currently holds one or more units of that type. As one example, inventory management system 210 may represent a mail order warehouse facility, and inventory items may represent merchandise stored in the warehouse facility. During operation, mobile drive units 220 may retrieve inventory holders 230 containing one or more inventory items requested in an order to be packed for delivery to a customer or inventory holders 230 carrying pallets containing aggregated collections of inventory items for shipment. Moreover, in particular embodiments of inventory management system 210, boxes containing completed orders may themselves represent inventory items.

In particular embodiments, inventory management system 210 may also include one or more inventory stations 250 (e.g., inventory transfer stations). Inventory stations 250 represent locations designated for the completion of particular tasks involving inventory items. Such tasks may include the removal of inventory items from inventory holders 230, the introduction of inventory items into inventory holders 230, the counting of inventory items in inventory holders 230, the decomposition of inventory items (e.g. from pallet- or case-sized groups to individual inventory items), the consolidation of inventory items between inventory holders 230, and/or the processing or handling of inventory items in any other suitable manner. In particular embodiments, inventory stations 250 may just represent the physical locations where a particular task involving inventory items can be completed within workspace 270. In alternative embodiments, inventory stations 250 may represent both the physical location and also any appropriate equipment for processing or handling inventory items, such as scanners for monitoring the flow of inventory items in and out of inventory management system 210, communication interfaces for communicating with management module 215, and/or any other suitable components. Inventory stations 250 may be controlled, entirely or in part, by human operators or may be fully automated. Moreover, the human or automated operators of inventory stations 250 may be capable of performing certain tasks to inventory items, such as packing, counting, or transferring inventory items, as part of the operation of inventory management system 210.

Workspace 270 represents an area associated with inventory management system 210 in which mobile drive units 220 can move and/or inventory holders 230 can be stored. For example, workspace 270 may represent all or part of the floor of a mail-order warehouse in which inventory management system 210 operates. Although FIG. 2 shows, for the purposes of illustration, an embodiment of inventory management system 210 in which workspace 270 includes a fixed, predetermined, and finite physical space, particular embodiments of inventory management system 210 may include mobile drive units 220 and inventory holders 230 that are configured to operate within a workspace 270 that is of variable dimensions and/or an arbitrary geometry. While FIG. 2 illustrates a particular embodiment of inventory management system 210 in which workspace 270 is entirely enclosed in a building, alternative embodiments may utilize workspaces 270 in which some or all of the workspace 270 is located outdoors, within a vehicle (such as a cargo ship), or otherwise unconstrained by any fixed structure.

In operation, management module 215 selects appropriate components to complete particular tasks and transmits task assignments 218 to the selected components to trigger completion of the relevant tasks. Each task assignment 218 defines one or more tasks to be completed by a particular component. These tasks may relate to the retrieval, storage, replenishment, and counting of inventory items and/or the management of mobile drive units 220, inventory holders 230, inventory stations 250 and other components of inventory management system 210. Depending on the component and the task to be completed, a particular task assignment 218 may identify locations, components, and/or actions associated with the corresponding task and/or any other appropriate information to be used by the relevant component in completing the assigned task.

In particular embodiments, management module 215 generates task assignments 218 based, in part, on inventory requests that management module 215 receives from other components of inventory management system 210 and/or from external components in communication with management module 215. These inventory requests identify particular operations to be completed involving inventory items stored or to be stored within inventory management system 210 and may represent communication of any suitable form. For example, in particular embodiments, an inventory request may represent a shipping order specifying particular inventory items that have been purchased by a customer and that are to be retrieved from inventory management system 210 for shipment to the customer. Management module 215 may also generate task assignments 218 independently of such inventory requests, as part of the overall management and maintenance of inventory management system 210. For example, management module 215 may generate task assignments 218 in response to the occurrence of a particular event (e.g., in response to a mobile drive unit 220 requesting a space to park), according to a predetermined schedule (e.g., as part of a daily start-up routine), or at any appropriate time based on the configuration and characteristics of inventory management system 210. After generating one or more task assignments 218, management module 215 transmits the generated task assignments 218 to appropriate components for completion of the corresponding task. The relevant components then execute their assigned tasks.

With respect to mobile drive units 220 specifically, management module 215 may, in particular embodiments, communicate task assignments 218 to selected mobile drive units 220 that identify one or more destinations for the selected mobile drive units 220. Management module 215 may select a mobile drive unit 220 to assign the relevant task based on the location or state of the selected mobile drive unit 220, an indication that the selected mobile drive unit 220 has completed a previously-assigned task, a predetermined schedule, and/or any other suitable consideration. These destinations may be associated with an inventory request the management module 215 is executing or a management objective the management module 215 is attempting to fulfill. For example, the task assignment may define the location of an inventory holder 230 to be retrieved, an inventory station 250 to be visited, a storage location where the mobile drive unit 220 should park until receiving another task, or a location associated with any other task appropriate based on the configuration, characteristics, and/or state of inventory management system 210, as a whole, or individual components of inventory management system 210. For example, in particular embodiments, such decisions may be based on the popularity of particular inventory items, the staffing of a particular inventory station 250, the tasks currently assigned to a particular mobile drive unit 220, and/or any other appropriate considerations.

As part of completing these tasks mobile drive units 220 may dock with and transport inventory holders 230 within workspace 270. Mobile drive units 220 may dock with inventory holders 230 by connecting to, lifting, and/or otherwise interacting with inventory holders 230 in any other suitable manner so that, when docked, mobile drive units 220 are coupled to and/or support inventory holders 230 and can move inventory holders 230 within workspace 270. While the description herein focuses on particular embodiments of mobile drive unit 220 and inventory holder 230 that are configured to dock in a particular manner, alternative embodiments of mobile drive unit 220 and inventory holder 230 may be configured to dock in any manner suitable to allow mobile drive unit 220 to move inventory holder 230 within workspace 270. Additionally, as noted herein, in particular embodiments, mobile drive units 220 represent all or portions of inventory holders 230. In such embodiments, mobile drive units 220 may not dock with inventory holders 230 before transporting inventory holders 230 and/or mobile drive units 220 may each remain continually docked with a particular inventory holder 230.

While the appropriate components of inventory management system 210 complete assigned tasks, management module 215 may interact with the relevant components to ensure the efficient use of space, equipment, manpower, and other resources available to inventory management system 210. As one specific example of such interaction, management module 215 is responsible, in particular embodiments, for planning the paths mobile drive units 220 take when moving within workspace 270 and for allocating use of a particular portion of workspace 270 to a particular mobile drive unit 220 for purposes of completing an assigned task. In such embodiments, mobile drive units 220 may, in response to being assigned a task, request a path to a particular destination associated with the task. Moreover, while the description herein focuses on one or more embodiments in which mobile drive unit 220 requests paths from management module 215, mobile drive unit 220 may, in alternative embodiments, generate its own paths.

Components of inventory management system 210 may provide information to management module 215 regarding their current state, other components of inventory management system 210 with which they are interacting, and/or other conditions relevant to the operation of inventory management system 210. This may allow management module 215 to utilize feedback from the relevant components to update algorithm parameters, adjust policies, or otherwise modify its decision-making to respond to changes in operating conditions or the occurrence of particular events.

In addition, while management module 215 may be configured to manage various aspects of the operation of the components of inventory management system 210, in particular embodiments, the components themselves may also be responsible for decision-making relating to certain aspects of their operation, thereby reducing the processing load on management module 215.

Thus, based on its knowledge of the location, current state, and/or other characteristics of the various components of inventory management system 210 and an awareness of all the tasks currently being completed, management module 215 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory management system 210 may be able to support a number of techniques for efficiently executing various aspects of the operation of inventory management system 210. As a result, particular embodiments of management module 215 may, by implementing one or more management techniques described herein, enhance the efficiency of inventory management system 210 and/or provide other operational benefits.

Figure 3:
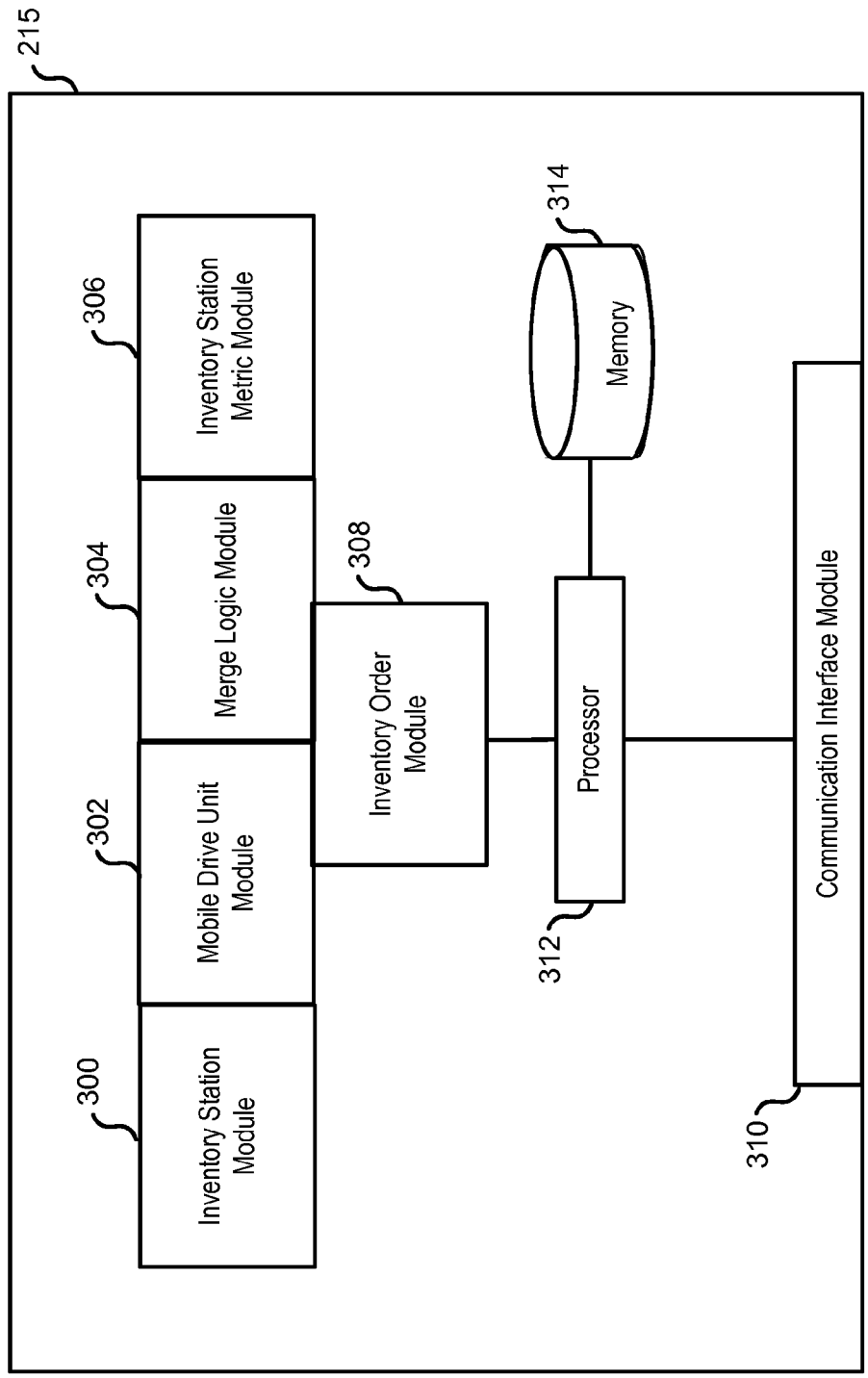
FIG. 3 illustrates in greater detail the components of an example management module that may be utilized in particular embodiments of the inventory management system as described herein, in accordance with at least one embodiment.

FIG. 3 illustrates in greater detail the components of an example management module 215 that may be utilized in particular embodiments of the inventory management system as described herein, in accordance with at least one embodiment. As shown, the example embodiment includes an inventory station module 300, a mobile drive unit module 302, a merge logic module 304, an inventory station metric module 306, an inventory order module 308, a communication interface module 310, a processor 312, and memory 314. Management module 215 may represent a single component, multiple components located at a central location within inventory management system 210, or multiple components distributed throughout inventory management system 210. For example, management module 215 may represent components of one or more mobile drive units 220 that are capable of communicating information between the mobile drive units 220 and coordinating the movement of mobile drive units 220 within workspace 270 or components of inventory transfer stations that are capable of communicating information between each inventory transfer station and coordinating the movement of inventory within workspace 270. In general, management module 215 may include any appropriate combination of hardware and/or software suitable to provide the described functionality.

Processor 312 is operable to execute instructions associated with the functionality provided by management module 215. Processor 312 may comprise one or more general purpose computers, dedicated microprocessors, or other processing devices capable of communicating electronic information. Examples of processor 312 include one or more application-specific integrated circuits (ASICs), field programmable gate arrays (FPGAs), digital signal processors (DSPs) and any other suitable specific or general purpose processors.

Memory 314 stores processor instructions, inventory requests, reservation information, state information for the various components of inventory management system 210 and/or any other appropriate values, parameters, or information utilized by management module 215 during operation such as performance metrics associated with each inventory transfer station. Memory 314 may represent any collection and arrangement of volatile or nonvolatile, local or remote devices suitable for storing data. Examples of memory 314 include, but are not limited to, random access memory (RAM) devices, read only memory (ROM) devices, magnetic storage devices, optical storage devices or any other suitable data storage devices.

Inventory station module 300 may be configured to determine and provide instructions to various components of the inventory transfer stations located within the inventory management system. The inventory station module 300 may generate or determine various tasks that are communicated to the components of the inventory transfer station such as:

the inbound conveyor lane, the outbound conveyor lane (where each conveyor lane includes a sequencing belt connected to a variable control drive for increasing or decreasing the speed of each conveyor), the VRC, actuators or other locking mechanisms (such as pneumatic locks) coupled with the accumulation area, or the empty container de-stacker. Further, the inventory station module 300 may provide signals to an operator interacting with a particular inventory transfer station via visual and/or audio indicators associated with the inventory transfer station (such as utilizing a put-to-light system) or any other suitable indicator to aid the operator in placing inventory in the correct empty container in accordance with a customer order. The inventory station module 300 may determine and provide instructions, as described above, based on metrics obtained or received by the inventory station metric module 306, or information from the inventory order module 308 and merge logic module 304. In embodiments, the inventory station module 300 and the mobile drive unit module 302 may be configured to utilize performance metrics of particular inventory transfer stations to instruct particular unmanned mobile drive units to move container holders to said particular stations for more efficient transfer and/or processing. For example, the location of each station, the performance of each station, or the current level of waiting fulfilled containers may be utilized as data points to direct the mobile drive units and orders to be associated with each transfer station.

Mobile drive unit module 302 may be configured to generate and provide instructions to unmanned mobile drive units within the inventory management system in accordance with a task to move a particular container holder to or from a particular inventory transfer station. For example, the mobile drive unit module 302 may, upon receiving order information from inventory order module 308, generate and provide a task (or instructions) to an unmanned mobile drive unit to retrieve a container holder and move to an inventory transfer station to allow an operator to remove inventory within one or more containers of the container holder. The operator may place the inventory in a previously empty container thereby creating a fulfilled container which may be transferred to an accumulation area as described herein. In embodiments, the inventory transfer stations may be utilized to store inventory into particular containers included in container holders and instructions may be generated and provided to mobile drive units to move the container holders back to a storage area of the inventory management system subsequent to inventory being placed in the containers.

Merge logic module 304 may be configured to determine and provide instructions which indicate a sequence to release fulfilled containers from an accumulation area to an outbound conveyor lane that is part of an inventory transfer station as described herein. The merge logic module 304 may determine this merging logic based on one or more data points that include metrics obtained by the inventory station metric module 306 (that indicate performance of each inventory transfer station) and prioritization information obtained by the inventory order module 308. The merging logic may be communicated to the inventory station module 300 or directly to each inventory transfer station via the communication interface module 310. The merge logic module 304 may implement a supervised machine learning algorithm that utilizes the inventory transfer station metrics (data points) and prioritization information to determine the optimal discharge sequence for a plurality of inventory transfer stations that share various components (such as a shared inbound/outbound conveyor lane and VRC). The machine learning algorithm may update/change based on new metrics obtained from each station and may be further modified by the merge logic module 304 in accordance with the prioritization information such as by overriding or adjusting the determined optimal sequence to ensure particular fulfilled containers are released in a particular order. Thus, the machine learning algorithm may utilize operator feedback, inventory transfer station feedback, and facility/workspace feedback to update or change the sequence of release for fulfilled containers at each station. In an embodiment, the merge logic module 304 may have one or more predetermined sequences of release algorithms to invoke/utilize based on data received from each inventory transfer station. For example, if a particular pair or group of inventory transfer stations that share components are experiencing a lull in inventory transfers, the merge logic module 304 may invoke a predetermined "release all" algorithm that merely relies on the optical density signals or other signals received from fulfilled containers to effect immediate release of the fulfilled containers upon receipt in the accumulation area.

Inventory station metric module 306 may be configured to obtain and maintain various performance metrics from each inventory transfer station within the inventory management system. Performance metrics may include operator throughput speed, conveyor lane speed information, VRC speed information, de-stacking speed of an associated empty container de-stacker, time stamps of fulfilled containers received at the accumulation area, total dwell time of a fulfilled container within the inventory management system before shipping (either in response to a customer order, in response to a consolidation request, or in response to an inventory transfer request between facilities or worksites), equipment effectiveness information (such as voltage or current required by various components of the inventory transfer station). In embodiments, operator throughput speed includes any suitable metrics obtained from observing, obtaining, or capturing a particular operators speed in processing inventory transfers at an inventory transfer station in response to any of the requests or processes described herein. As described herein, the performance metrics may be communicated or provided to the merge logic module 304 for use in generating the aforementioned merging logic. In an embodiment, the management module 215 may utilize particular performance metrics (such as the equipment effectiveness information) to generate and provide instructions to maintenance operators associated with the inventory management system. For example, the management module 215 may be configured to utilize a set of policies or rules that indicate acceptable voltage ranges, speeds, and operator throughput for the inventory transfer stations. Upon violation of any of the rules or policies, instructions may be generated to other personnel associated with the inventory management system to perform maintenance or further investigate a particular inventory transfer station to determine the problem leading to the rule/policy violation.

Inventory order module 308 may be configured to receive and maintain order information associated with a customer order of an item or inventory stored within the inventory management system. The inventory order module 308 may provide instructions to an operator at a transfer station, via a user device, to marry a particular item to a particular empty container for further processing (e.g., packing and shipping) at other areas of the inventory management system or facility. In embodiments, each inventory transfer station may be configured to utilize scanning equipment, such as a bar code reader, radio frequency identification (RFID) reader, or any suitable identification scanner, to identify each incoming empty container at the inventory transfer station. A particular customer order may be associated with each scanned empty container for further placement of inventory that corresponds to the customer order by an operator at the inventory transfer station. The inventory order module 308 may provide placement information that may be utilized by the inventory station module 300 in generating and providing the appropriate signals/indications for use at each inventory transfer station to guarantee placement of the empty containers by the operator in an appropriate lane within the station. The inventory order module 308 may determine prioritization or release of particular containers that are associated with certain orders based on information associated with said orders. For example, if fast delivery is associated with a particular order, prioritization information may be provided to the inventory order module 308 and merge logic module 304 to aid in meeting any shipping deadlines associated with the order. In an embodiment, the inventory order module 308 may determine prioritization or release of particular containers based on inventory transfer station performance metrics, as described above, without requiring a customer order. In embodiments, determining prioritization for particular containers may aid processing and transferring inventory from one area of the workspace/facility to another or from one workspace/facility to another workspace/facility. In an embodiment, items and inventory may be transferred at the inventory transfer stations described herein to achieve inventory balancing across facilities, for consolidation of items or orders, in response to requests from other facilities, distribution centers, sortation centers, or for any suitable inter-facility transfers.

Communication interface module 310 facilitates communication between management module 215 and other components of inventory management system 210, including customer order information, inventory station performance metrics, prioritization information, merging logic instructions, route requests, route responses, and task assignments. The customer order information, inventory station performance metrics, prioritization information, merging logic instructions, route requests, route responses, and task assignments may represent communication of any form appropriate based on the capabilities of management module 215 and may include any suitable information. Depending on the configuration of management module 215, communication interface module 310 may be responsible for facilitating either or both of wired and wireless communication between management module 215 and the various components of inventory management system 210 including mobile drive units 220 and inventory transfer stations. In particular embodiments, management module 215 may communicate using communication protocols such as 802.11, Bluetooth, or Infrared Data Association (IrDA) standards. Furthermore, management module 215 may, in particular embodiments, represent a portion of mobile drive unit 220 or other components of inventory management system 210 such as inventory transfer stations. In such embodiments, communication interface module 310 may facilitate communication between management module 215 and other parts of the same system component.

In general, inventory station module 300, mobile drive unit module 302, merge logic module 304, inventory station metric module 306, inventory order module 308, and communication interface module 310 may each represent any appropriate hardware and/or software suitable to provide the described functionality. In addition, as noted above, management module 215 may, in particular embodiments, represent multiple different discrete components and any or all of inventory station module 300, mobile drive unit module 302, merge logic module 304, inventory station metric module 306, inventory order module 308, and communication interface module 310 may represent components physically separate from the remaining elements of management module 215. Moreover, any two or more of inventory station module 300, mobile drive unit module 302, merge logic module 304, inventory station metric module 306, inventory order module 308, and communication interface module 310 may share common components. For example, in particular embodiments, inventory station module 300, mobile drive unit module 302, merge logic module 304, inventory station metric module 306, and inventory order module 308 represent computer processes executing on processor 312 and communication interface module 310 comprises a wireless transmitter, a wireless receiver, and a related computer process executing on processor 312.

Figure 4:
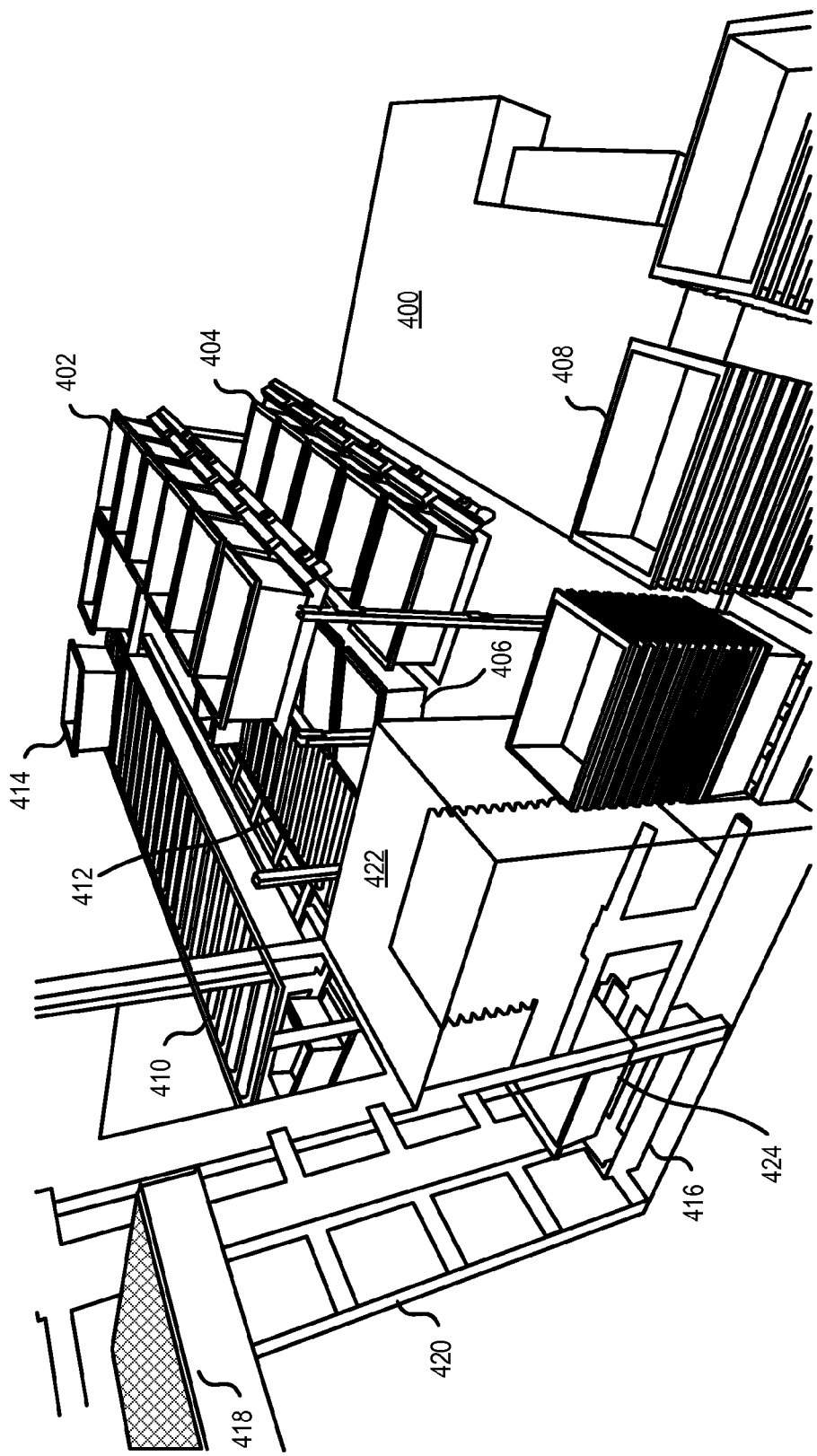
FIG. 4 illustrates a schematic view of an example inventory transfer station for moving inventory within an inventory management system as described herein, in accordance with at least one embodiment.

FIG. 4 illustrates a schematic view of an example inventory transfer station for moving inventory within an inventory management system as described herein, in accordance with at least one embodiment. FIG. 4 depicts one inventory transfer station 400 (although embodiments described herein may include two or more adjacent inventory transfer stations that share an elevator assembly and conveyor lane components) that includes a two tier container staging area comprised of an upper tier 402 and a lower tier 404 coupled with an accumulation area 406. In embodiments, the upper tier 402 may temporarily store inbound empty containers 408 until they are transferred by an operator (not pictured) to the lower tier 404 where inventory may be placed in the previously empty containers. The fulfilled containers in the lower tier 404 may then be transferred, either by the operator or by other mechanisms described herein, to the accumulation area 406. The two tier container staging area may be coupled with an inbound conveyor lane 410 and an outbound conveyor lane 412. The inbound conveyor lane 410 may be configured to provide or feed an empty container 414 to the upper tier 402 of a particular inventory transfer station such as station 400. The outbound conveyor lane 412 may be configured to remove or transfer fulfilled containers from the accumulation area to the VRC 416 for further movement to an outbound trunk line 418. In an embodiment, the operator may move empty containers from the inbound conveyor lane 410 to either the upper tier 402 or lower tier 404 for placement of inventory. Once a fulfilled container in the upper tier 402 is generated, the operator may move the fulfilled container from the upper tier 402 to the lower tier 404 and further into the accumulation area 406. Containers that become fulfilled in the lower tier 404 may be moved or transferred to the accumulation area 406 as described herein. The utilization of both the upper tier 402 and lower tier 404 to generate fulfilled containers may enable the fulfillment of more inventory transfer requests by the operator at an inventory transfer station.

The inventory transfer station 400 also includes an elevator assembly 420 coupled with the conveyor lanes 410, 412, and an empty container de-stacker 422. The empty container de-stacker 422 is configured to de-stack or single out a stack of empty containers 408 to a single container 424 which may be subsequently moved by the VRC 416 to the inbound conveyor lane 410 in accordance with at least one embodiment. In embodiments, the empty container de-stacker 422 may be configured to merely transfer containers with inventory to the VRC 416 in accordance with an inventory stow embodiment. Instructions provided by the management module 215 may convert the empty container de-stacker 422 to a transfer of fulfilled container operation. In embodiments, an operator associated with the inventory management system may provide the stacks of empty containers 408 for processing by the empty container de-stacker 422 or the stack of empty containers 408 may automatically be provided by other components such as an unmanned mobile drive unit. In accordance with at least one embodiment, the inventory transfer station 400 may be one component of a vertical multi-floor facility configuration. The vertical multi-floor facility configuration may include a single inventory transfer station on each floor for performing various aspects of the inventory transfer techniques described herein. For example, the elevator assembly 420 and VRC 416 may be configured to transfer fulfilled containers to other floors within the facility for further processing, transfer empty containers to the inbound conveyor lane 410 received from another floor within the facility, or transfer fulfilled containers from the inventory transfer station 400 to another floor where another inventory transfer station may move the inventory to a different container holder in accordance with an item stowing operation. In embodiments, the elevator assembly 420 may be replaced with a spiral chute or inclined conveyor to transfer fulfilled or empty containers to other floors or other parts of the inventory management system. In an embodiment, the unmanned mobile drive units can be used to transfer inventory among multiple vertically separated floors so that the floors can operate separately and collectively for efficient fulfillment of orders. In embodiments, the management module may be configured to receive an indication or signal that a particular floor of the multi-floor configuration is faulty. Upon receiving such a signal the management module may be configured to generate and provide instructions to the inventory transfer stations to change from a single direction inventory processing station to a bi-directional inventory processing station as described herein. In some embodiments, the management module may utilize facility or workspace information or indications to dynamically update the operation and configuration of particular inventory transfer stations. For example, the management module may receive an indication that a large amount of inventory has recently been received at a facility. Thus, instructions may be generated and provided to particular inventory transfer stations to update the station from fulfilling orders to stowing or storing inventory, e.g., into container holders/containers brought to each station by the unmanned mobile drive units.

Figure 5:
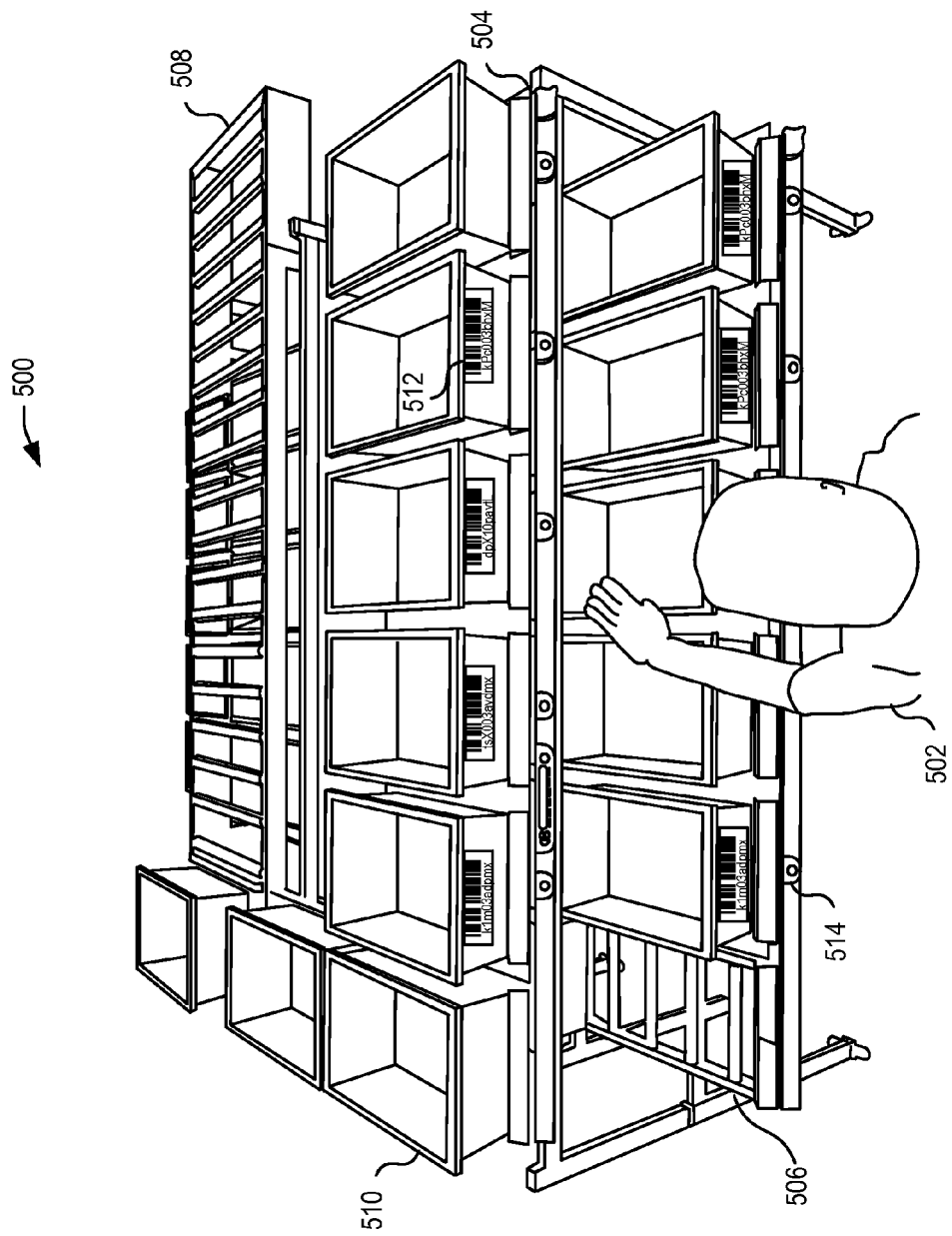
FIG. 5 illustrates an alternative view of an example inventory transfer station for moving inventory within an inventory management system, including a two tier container staging area configured to interact with containers provided by a conveyor lane as described herein, in accordance with at least one embodiment.

FIG. 5 illustrates an alternative view of an example inventory transfer station for moving inventory within an inventory management system, including a two tier container staging area configured to interact with containers provided by a conveyor lane as described herein, in accordance with at least one embodiment. The inventory transfer station 500 depicted in FIG. 5 includes an operator 502 interacting with a two tier container staging area that includes an upper tier 504 and a lower tier 506. The two tier container staging area is coupled with a conveyor lane 508 configured to provide empty containers 510 to the upper tier 504 as described herein. In embodiments, each empty container may include an image based scanning identifier 512, such as a bar code or RFID, for scanning by a user device or computing device (not pictured) associated with the inventory transfer station 500 and/or the operator 502.

The image based scanning identifier 512 may be read/scanned as the empty containers 510 are fed into the upper tier 504 of the two tier container staging area. As described above, the management module 215 may utilize the image based scanning identifier 512 to associate particular orders and inventory to a particular container for tracking and processing throughout the inventory management system. Further, the upper and lower tiers 504 and 506 may utilize one or more visual indicators 514 to aid the operator in placing an empty container 510 in the proper place within the tiers and/or placing or removing inventory from the containers. For example, FIG. 5 illustrates a put-to-light system (visual indicators 514) that is controlled by the management module 215. The put-to-light system may comprise a light emitting diode (LED) coupled with a momentary contact switch that is placed in the lower tier 506 to indicate to the management module 215 that the operator has placed an empty container in the appropriate position within the two tier container staging area. In embodiments, the inventory transfer station 500, upon receiving instructions from the management module 215, may be converted to a bi-directional conveyor configuration that utilizes one conveyor lane to provide empty containers 510 and remove or transfer fulfilled containers to the elevator assembly, VRC, and outbound trunk lanes (not pictured).

For example, the conveyor lane 508 may be configured with a bi-directional motorized roller that is coupled to the conveyor lane 508 and controlled by the management module 215 which determines when to switch between feeding empty containers to and taking fulfilled containers away from the inventory transfer station. The inventory transfer station 500, and therefore the management module 215, may utilize optical density sensor technology to determine that all lanes for empty containers within the upper and lower tiers 504, 506 are full of empty containers 510 as the trigger to switch the conveyor lane 508 to remove fulfilled containers from the upper and lower tiers 504, 506 for transfer to the elevator assembly and VRC. Optical density sensor technology may also be utilized to provide an indication to the management module 215 as to the status of the accumulation area (not pictured) of an inventory transfer station 500. In embodiments, optical density sensor technology includes any suitable time of flight signal technology between the source of the optical density sensor and the inventory transfer stations. This can include any electronic signal technology that can determine the elapsed time period between a transmission of a signal from a source and return of the signal, or at least a portion thereof, back to the source. For example, the distance between the optical density sensor and the accumulation area of the inventory transfer station with and without a fulfilled container may be known as well as the speed of the signal (e.g., the speed of light for lasers for example) to determine the presence or absence of the fulfilled container in the accumulation area or other parts of the inventory transfer station. In embodiments, other sensor technology may be utilized for determining the presence or absence of a fulfilled container or container in the accumulation area. For example, proximity sensors, photoeyes, light curtains, contact sensors, imaging devices or cameras, near field communication (NFC) technology, radio frequency identification (RFID) technology, or any other suitable sensor technology may be utilized in place of or in combination with any of the described sensor technology to aid the management module 215 in determining the presence or absence of the fulfilled container within an area of the inventory transfer station. The merge logic module 304 may utilize the optical density indication to determine the number of fulfilled containers available and waiting in the accumulation area for merging into the outbound conveyor lane.

Figure 6:
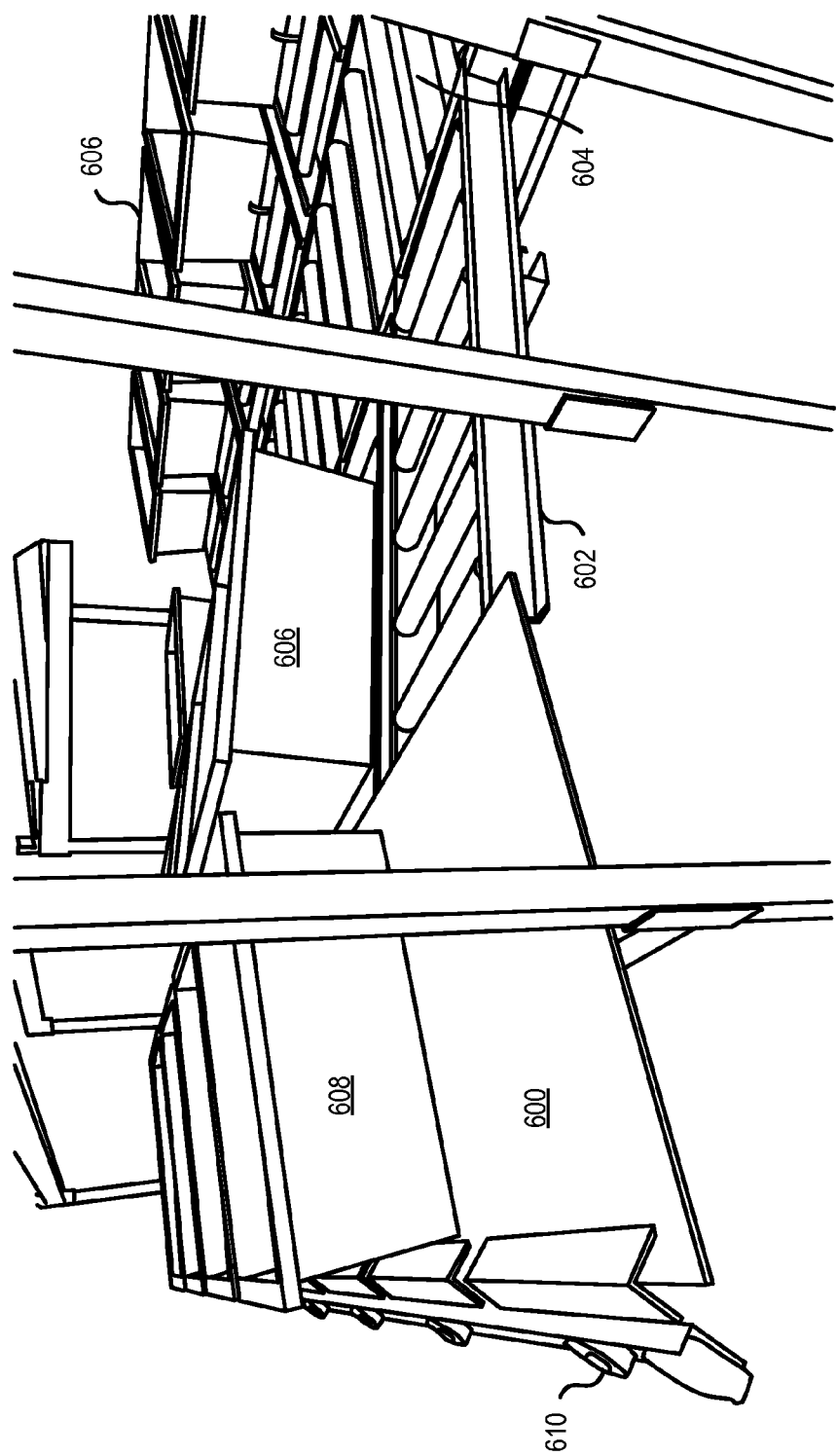
FIG. 6 illustrates an alternative view of an example inventory transfer station for moving inventory within an inventory management system, including an inventory transfer lane and a queue lane (accumulation area) configured to provide containers with inventory to an outbound conveyor lane as described herein, in accordance with at least one embodiment.

FIG. 6 illustrates an alternative view of an example inventory transfer station for moving inventory within an inventory management system, including an inventory transfer lane and one or more queue lanes (accumulation area) configured to provide containers with inventory to an outbound conveyor lane as described herein, in accordance with at least one embodiment. FIG. 6 includes the lower tier 600 of a two tier container staging area. The two tier container staging area includes an accumulation area 602 coupled with an outbound conveyor lane 604 configured to move fulfilled containers 606 from multiple inventory transfer stations. The lower tier 600 is configured to removably receive empty containers 608 from an upper tier (not pictured) of the two tier container staging area.

As described herein, the inventory transfer station may include one or more visual indicators 610 to aid in instructing an operator to place an empty container into the appropriate lane within the lower tier 600. An operator, upon placing an item or inventory within an empty container such as container 608 may transfer the fulfilled container 606 to the accumulation area 602. In embodiments, the inventory transfer station may utilize other methods for transferring fulfilled containers 606 from the lower tier 600 to the accumulation area 602. For example, the lower tier may be configured so that most of the surface area of the container 608 rests on a precipice between the lower tier 600 and accumulation area 602 which would enable the placement of inventory to provide enough force to push the fulfilled container 606 over the precipice and onto the accumulation area 602. In embodiments, fulfilled containers may be transferred to the accumulation area 602 via wheels that require a small amount of force, by utilizing a span track roller, or automated methods such as by utilizing a vulcanized roller that uses high friction materials to pull the fulfilled container from the lower tier 600 to the accumulation area 602 upon receiving an instruction from the management module 215.

Figure 7:
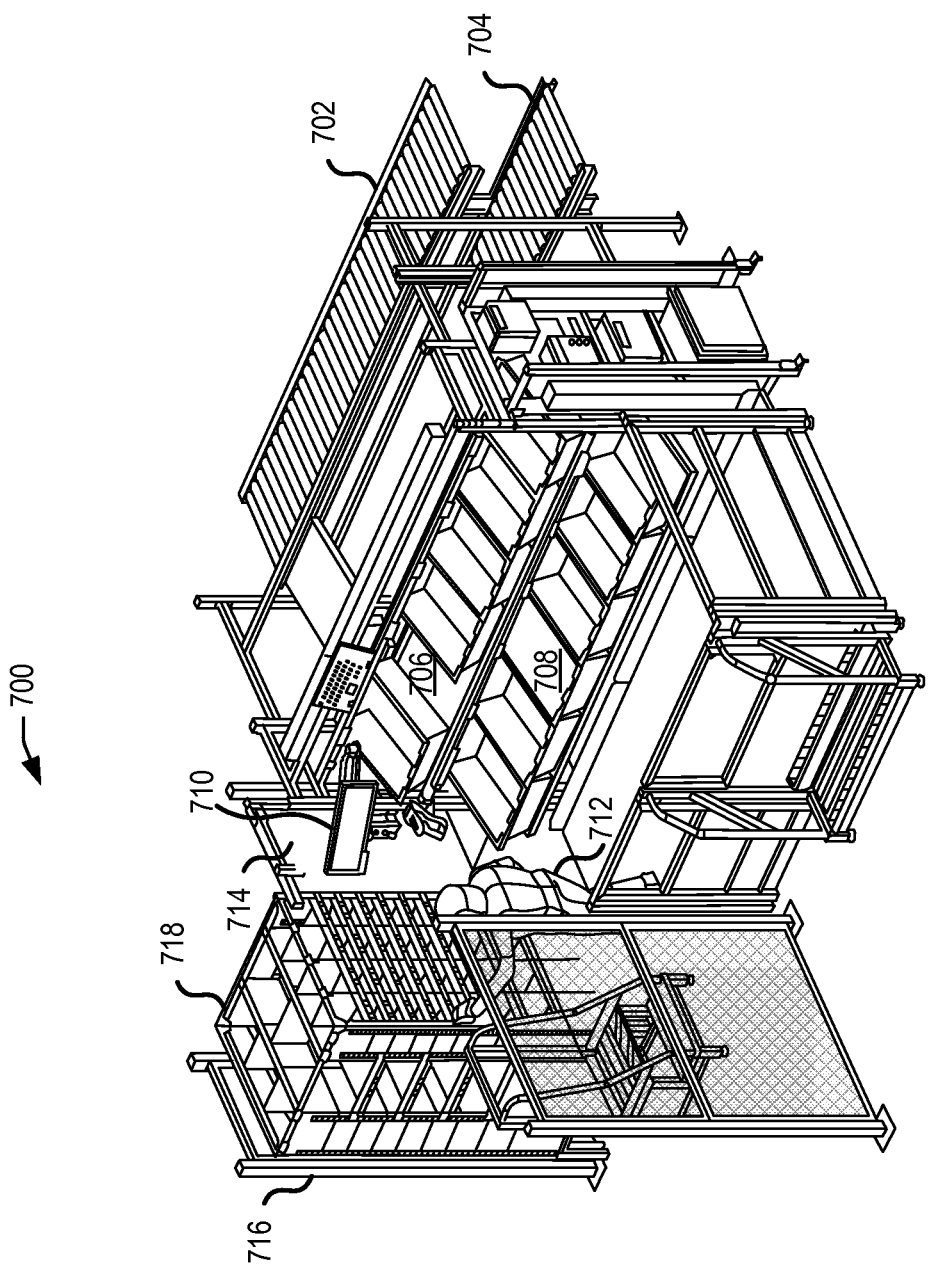
FIG. 7 illustrates a schematic view of an example inventory transfer station for moving inventory within an inventory management system as described herein, in accordance with at least one embodiment.

FIG. 7 illustrates a schematic view of an example inventory transfer station for moving inventory within an inventory management system as described herein, in accordance with at least one embodiment. FIG. 7 includes an inventory transfer station 700 that may be mirrored to another inventory transfer station (not pictured) across the inbound conveyor lane 702 and outbound conveyor lane 704. The inventory transfer station 700 includes the two tier container staging area that comprises at least an upper tier 706 and a lower tier 708, a user device 710 for providing instructions to the operator 712 regarding placement or removal of inventory, and a reading/scanning device 714 for reading/scanning visual image identifiers or other identifiers associated with incoming empty containers and/or inventory.

As described herein, as empty containers are provided by the inbound conveyor lane 702, the reading/scanning device 714 may interact with the visual image identifiers and provide unique identifier information to the management module 215 to aid in associating containers with orders received from customers for inventory stored within the inventory management system. FIG. 7 also illustrates a container holder 716 with one or more containers 718 that may store inventory. Upon receiving instructions from the management module 215, an unmanned mobile drive unit may move the container holder 716 from a storage area within the inventory management system to the inventory transfer station 700. The container holder 716 may be docked or moved within a certain range of the inventory transfer station 700 to enable the operator 712 to transfer inventory within containers 718 to containers in the upper or lower tiers 706, 708 of the two tier container staging area. The user device 710 may provide instructions to the operator 712 indicating which inventory to remove from containers 718 and place in the containers included in the upper or lower tiers 706, 708 based on a determination made by the management module 215 as described above. In an embodiment, fulfilled containers may be provided by the inbound conveyor lane 702, the reading/scanning device 714 may interact with the visual image identifiers and provide unique identifier information to the management module 215 to aid in associating inventory for other inventory transfer processes such as stowing of inventory. The operator 712 may transfer inventory from the containers in the upper or lower tiers 706, 708 to the containers 718 of the container holder 716. The user device 710 may provide instructions to the operator 712 indicating which inventory to remove from the fulfilled containers and place in appropriate containers 718 of the container holder 716 based on a determination made by the management module 215.

Figure 8:
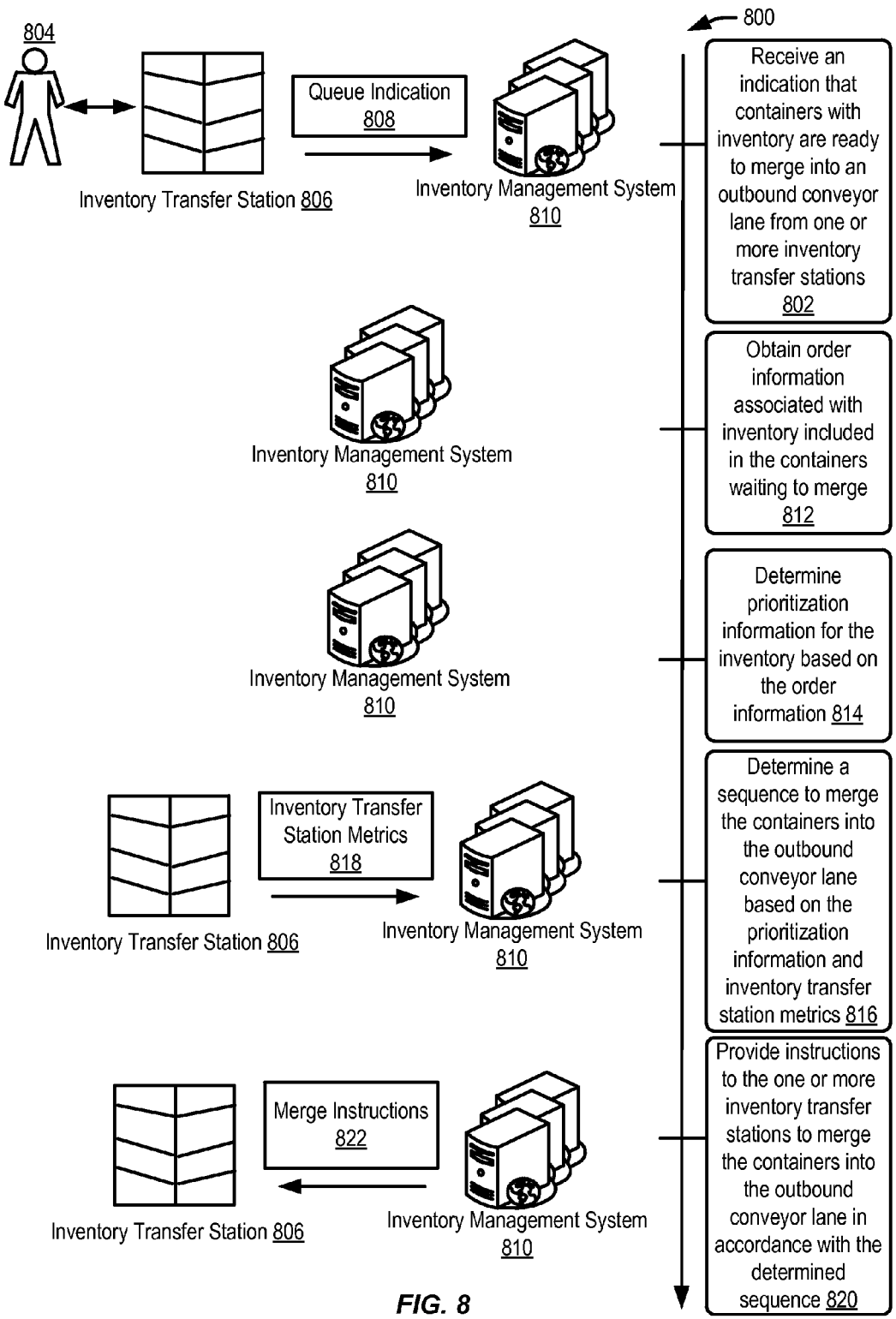
FIG. 8 illustrates an example flow for determining a sequence to merge containers with inventory into an outbound conveyor lane as described herein, in accordance with at least one embodiment.

FIG. 8 illustrates an example flow for determining a sequence to merge containers with inventory into an outbound conveyor lane as described herein, in accordance with at least one embodiment. The example flow 800 illustrated in FIG. 8 includes one or more operations. However, the order in which the operations are described is not intended to be construed as a limitation, and any number of the described operations can be combined in any order and/or in parallel to implement the described flow. The flow 800 may include receiving an indication that containers with inventory are ready to merge into an outbound conveyor lane from one or more inventory transfer stations at 802. In embodiments, upon an operator 804 transferring fulfilled containers to an accumulation lane or area of an inventory transfer station 806, a queue indication 808 or other indication may be provided to the inventory management system 810. As described herein, each inventory transfer station 806 may be configured to utilize optical density sensor technology to determine the presence of a fulfilled container within the accumulation lane. The inventory management system 810, which implements the management module 215, may receive a signal or other indication from the optical density sensors and interpret the signal to determine the presence or absence of a fulfilled container within the accumulation lane of an inventory transfer station 806. The flow 800 may include obtaining order information associated with inventory included in the containers waiting to merge at 812. For example, the inventory management system 810 may obtain or maintain order information from a plurality of customers for inventory included in containers within the workspace or facility. The inventory management system 810 may communicate with an electronic marketplace to obtain or maintain the orders for the inventory stored within the facility or workspace. As described herein, as empty containers are fed or provided to each inventory transfer station, a reading or scanning device may interact with a barcode or identifier of the container to associate a customer order with inventory stored within the facility or workspace, e.g., in a particular container holder.

The flow 800 may include determining prioritization information for the fulfilled containers, and their inventory, that are awaiting merging instructions to a shared outbound conveyor lane based on the order information associated with the inventory at 814. In embodiments, the inventory management system 810 may utilize the order information to determine whether a particular fulfilled container should be merged or output to the outbound conveyor lane before other fulfilled containers in order to meet shipping and/or processing deadlines associated with the order. For example, a particular customer order and inventory pairing represented by the fulfilled container may have an expedited shipping deadline that must take priority over other non-expedited customer orders to meet expected shipping and fulfillment deadlines. The inventory management system 810 may also receive or obtain other metrics from the facility or workspace that indicate bottlenecks, obstructions, or other upstream or downstream delays within the facility and properly adjust the prioritization information to associate with each fulfilled container awaiting merging within the outbound conveyor lane. In an embodiment, determining prioritization information for the fulfilled containers may be based on performance metrics of the inventory transfer stations in cases where inventory is being transferred from one facility/workspace to another facility/workspace or for consolidation requests to move inventory from one area within the facility/workspace to another area of the same facility/workspace. Further, the prioritization information may still be based on shipping and/or processing deadlines associated with the inventory transfer requests or tasks being fulfilled by a particular inventory transfer station.

The flow 800 may include determining a sequence to merge the containers into the outbound conveyor lane based on the prioritization information and inventory transfer station metrics at 816. In embodiments, the inventory management system 810 may obtain/maintain or receive inventory transfer station metrics 818 from each inventory transfer station 806 within a facility. For example, the inventory transfer station metrics 816 may include operator throughput speed, conveyor lane speed information, VRC speed information, de-stacking speed of an associated empty container de-stacker, time stamps of fulfilled containers received at the accumulation area, total dwell time of a fulfilled container within the facility before shipping from each inventory transfer station, equipment effectiveness information (such as voltage or current required by various components of the inventory transfer station), or any other suitable metric that may be obtained from an inventory transfer station for determining the effectiveness and speed of fulfilling customer orders by said station. In an embodiment, the inventory management system 810 may utilize the prioritization information and the inventory transfer station metrics 818 to determine an optimal sequence to merge fulfilled containers from one or more inventory transfer station accumulation areas to a shared outbound conveyor lane. The determined optimal sequence to merge fulfilled containers may indicate which order and at what time point each fulfilled container should be released from the accumulation area in order to maximize efficiency of processing orders and take into account any exceptions such as priority orders. The flow 800 may conclude by providing instructions to the one or more inventory transfer stations to merge the containers into the outbound conveyor lane in accordance with the determined sequence at 820. In embodiments, the inventory management system 810 may provide merge instructions 822 to each inventory transfer station 806 that indicate which fulfilled containers to release to the outbound conveyor lane and at what time point to release said containers. In an embodiment, the merge instructions may be provided directly to the inventory transfer station 806 to release the fulfilled containers, or signals and data may be sent to discrete components of each inventory transfer station 806 to proceed with releasing the fulfilled containers (such as sending release signals to actuator/lock configurations that hold the fulfilled containers within the accumulation area). Additional lock and release mechanisms may be utilized in the inventory transfer stations to enable the proper merging of fulfilled containers according to instructions provided by the inventory management system 810. For example, controlled rollers/conveyors may be utilized in the accumulation area, a moving arm/plate may block/unblock an exit from the accumulation area to the outbound conveyor lane, signals may be provided to increase/decrease an incline of the accumulation area to move the fulfilled containers to the outbound conveyor lane by gravity, or any combination of the methods described herein or any suitable variations may be utilized to temporarily store and release fulfilled containers from the accumulation area to the outbound conveyor lane.

Figure 9:
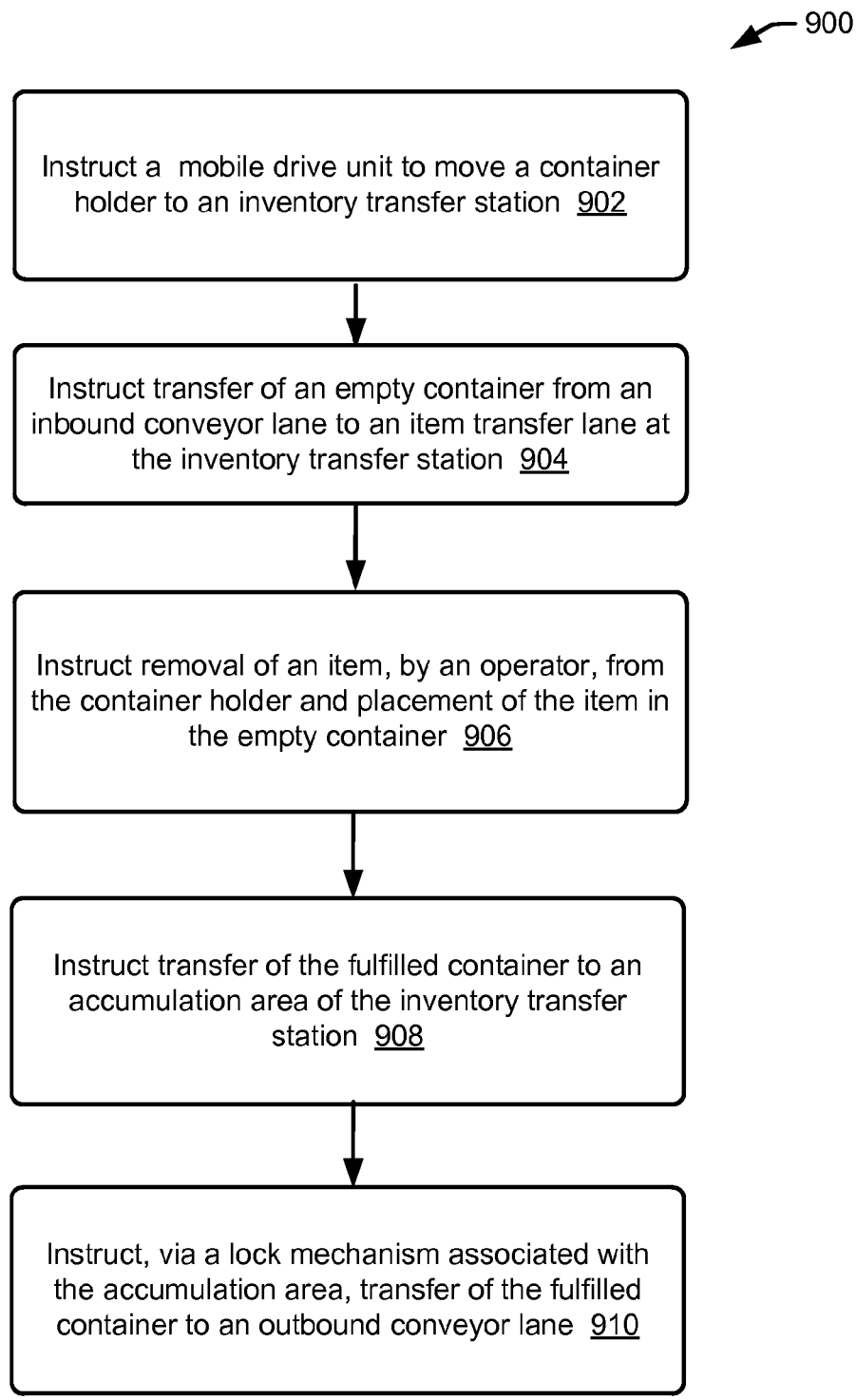
FIG. 9 illustrates a flow diagram depicting example acts for implementing techniques relating to managing movement of inventory at an inventory transfer station included in an inventory management system as described herein, in accordance with at least one embodiment.

FIG. 9 illustrates a flow diagram depicting example acts for implementing techniques relating to managing movement of inventory at an inventory transfer station included in an inventory management system as described herein, in accordance with at least one embodiment. The management module 215 (FIGS. 2 and 3) may perform the process 900 of FIG. 9. The process 900 begins at 902 by instructing a mobile drive unit to move a container holder to an inventory transfer station. In embodiments, the mobile drive unit may be instructed to move a container holder from an area, such as a storage area, within a workspace to an inventory transfer station. The container holder may include one or more containers that are each configured to receive and store one or more items. At 904, the process 900 instructs the transfer of an empty container from an inbound conveyor lane to an item transfer lane (e.g., upper or lower tier of the two tier container staging area referred to in FIGS. 1, 4, 5, and 7) at the inventory transfer station. In an embodiment, the empty container may be received at the inventory transfer station via a vertical reciprocating conveyor (VRC) that is coupled with the inbound conveyor lane.

At 906, the process 900 instructs removal of an item, by an operator, from the container holder and placement of the item in the empty container. In embodiments, instructing transfer of an item from the container holder may indicate removal of an item from a particular container within the container holder. Placing the item in a previously empty container may thereby create a fulfilled container that is ready for transfer. In an embodiment, the operator transferring the item from a particular container within the container holder to an empty container may include providing instructions to an automated robotic member that is configured to receive inventory transfer instructions from the management module 215. At 908, the process 900 instructs transfer of the fulfilled container to an accumulation area of the inventory transfer station. In embodiments, the accumulation area may be connected to the item transfer lane and coupled with an outbound conveyor lane that is configured to move fulfilled containers to the VRC or other downstream processes or components. The accumulation area may utilize a lock mechanism that is coupled to an actuator to prevent transfer of the fulfilled containers to the outbound conveyor lane until instructions are received from the management module 215. The process 900 may conclude at 910 by instructing, via a lock mechanism associated with the accumulation area, transfer of the fulfilled container to an outbound conveyor lane. In an embodiment, the outbound conveyor lane may be configured to transfer the fulfilled containers to the VRC that will further transfer the fulfilled containers to other areas of the workspace/facility for further processing (shipping, packaging, etc.) via an outbound trunk lane or other suitable transfer techniques.

Figure 10:
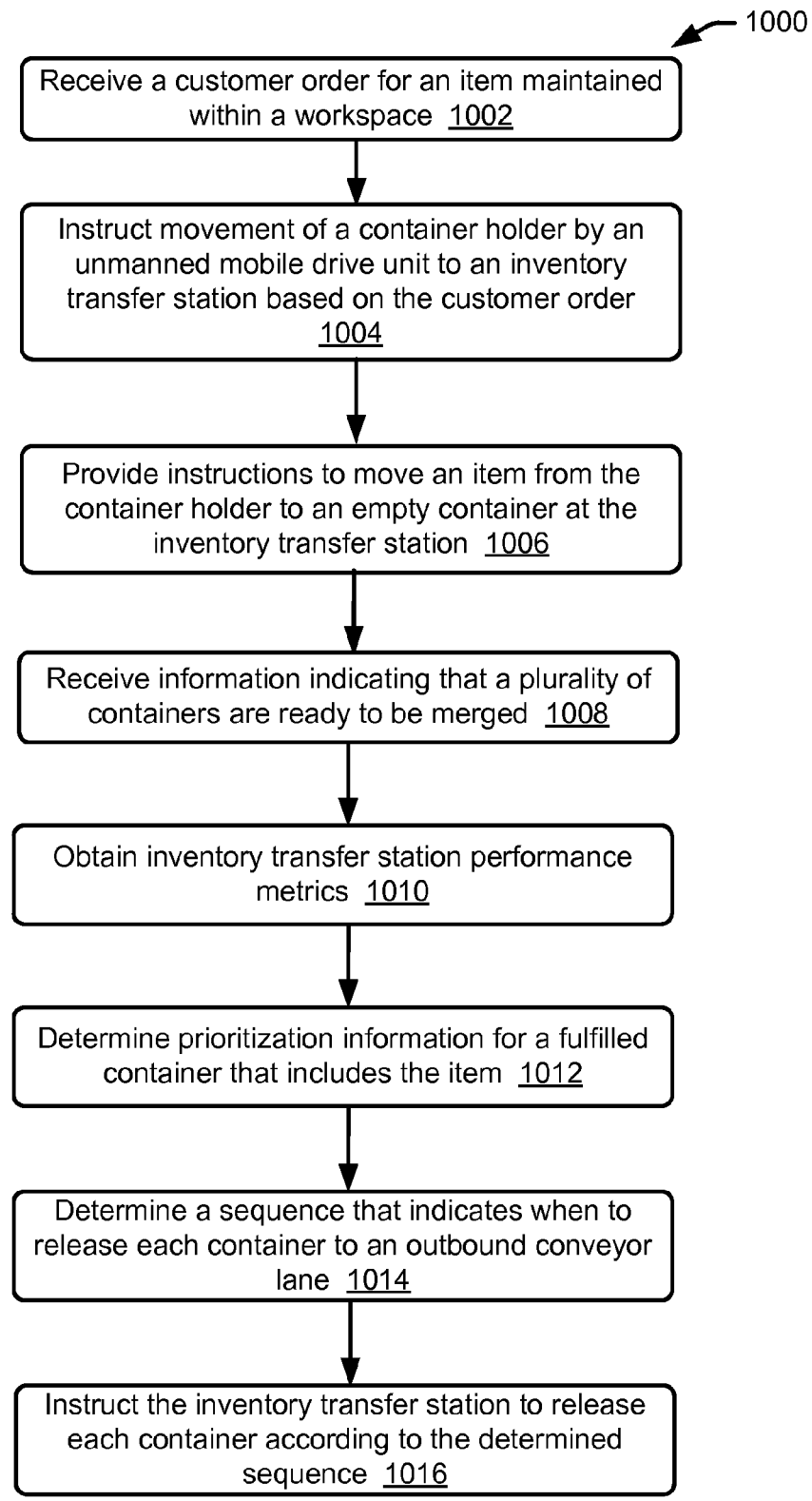
FIG. 10 illustrates a flow diagram depicting example acts for implementing techniques relating to determining a sequence to merge containers with inventory into an outbound conveyor lane as described herein, in accordance with at least one embodiment.

FIG. 10 illustrates a flow diagram depicting example acts for implementing techniques relating to determining a sequence to merge containers with inventory into an outbound conveyor lane as described herein, in accordance with at least one embodiment. The management module 215 (FIGS. 2 and 3) may perform the process 1000 of FIG. 10. The process 1000 begins at 1002 by receiving a customer order for an item maintained within a workspace. The workspace may include a plurality of container holders including one or more containers configured to receive and store one or more items. At 1004, the process 1000 instructs movement of a container holder by an unmanned mobile drive unit to an inventory transfer station based on the customer order. As described above, the inventory transfer station may be located within the workspace. At 1006, the process 1000 provides instructions to move an item from the container holder to an empty container at the inventory transfer station. As described above, the inventory transfer station may include a two tier container staging area for temporarily holding and processing empty containers before an associate places one or more items within the container, thereby generating a fulfilled container.

At 1008, the process 1000 receives information indicating that a plurality of containers are ready to be merged. In an embodiment, the information may be received from an accumulation area of the inventory transfer station and the plurality of containers may be ready to merge into an outbound conveyor lane associated with the inventory transfer station. At 1010, the process 1000 obtains inventory transfer station performance metrics. In an embodiment, the inventory transfer station performance metrics may indicate customer order throughput for the particular inventory transfer station. At 1012, the process 1000 determines prioritization information for a fulfilled container that includes the item. The prioritization information may be determined based on the customer order and the inventory transfer station performance metrics. At 1014, the process 1000 determines a sequence that indicates when to release each container to an outbound conveyor lane. Each container may be released and merged into the outbound conveyor lane from the accumulation area based on the inventory transfer station performance metrics and the prioritization information. The process 1000 may conclude at 1016 by instructing the inventory transfer station to release each container according to the determined sequence. In an embodiment, instructions may be provided directly to the accumulation area, by providing signals or indications to actuators and lock mechanisms associated with the accumulation area, to merge and release each container.

Figure 11:
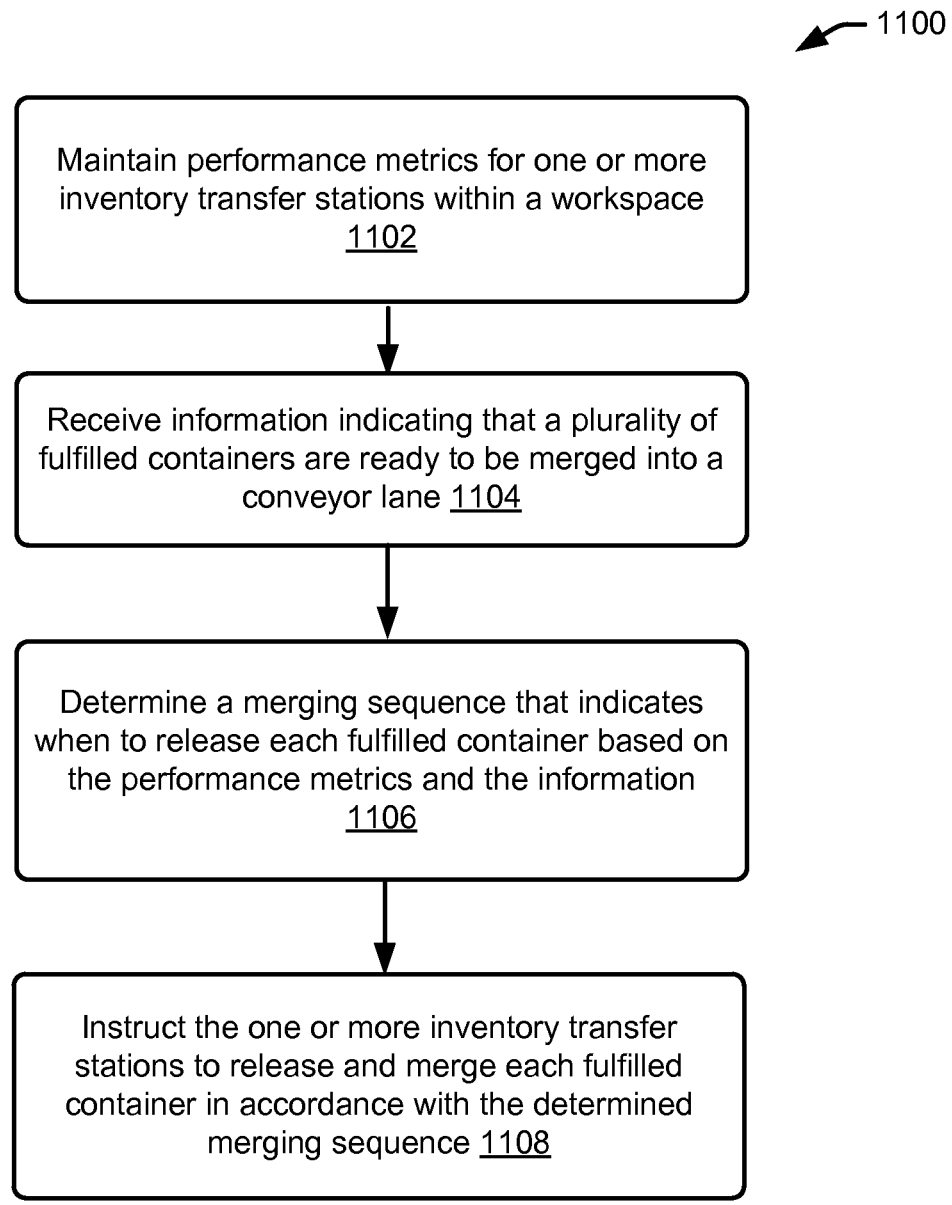
FIG. 11 illustrates a flow diagram depicting example acts for implementing techniques relating to determining a sequence to merge containers with inventory into an outbound conveyor lane as described herein, in accordance with at least one embodiment.

FIG. 11 illustrates a flow diagram depicting example acts for implementing techniques relating to determining a sequence to merge containers with inventory into an outbound conveyor lane as described herein, in accordance with at least one embodiment. The management module 215 (FIGS. 2 and 3) may perform the process 1100 of FIG. 11. The process 1100 begins at 1102 by maintaining performance metrics for one or more inventory transfer stations within a workspace. The performance metrics may indicate the effectiveness of an operator associated with an inventory transfer station or the equipment effectiveness of the inventory transfer station. At 1104, the process 1100 receives information indicating that a plurality of fulfilled containers are ready to be merged into a conveyor lane. The information may be received from one or more inventory transfer stations within the workspace. At 1106, the process 1100 determines a merging sequence that indicates when to release each fulfilled container based on the performance metrics and the information. In an embodiment, the merging sequence is determined by a machine learning algorithm that utilizes the performance metrics and the information from each inventory transfer station. The process 1100 may conclude at 1108 by instructing the one or more inventory transfer stations to release and merge each fulfilled container in accordance with the determined merging sequence. As described above, the determined merging sequence may be further updated or changed based on prioritization information derived from customer orders associated with the items residing in the fulfilled containers awaiting merging.

Figure 12:
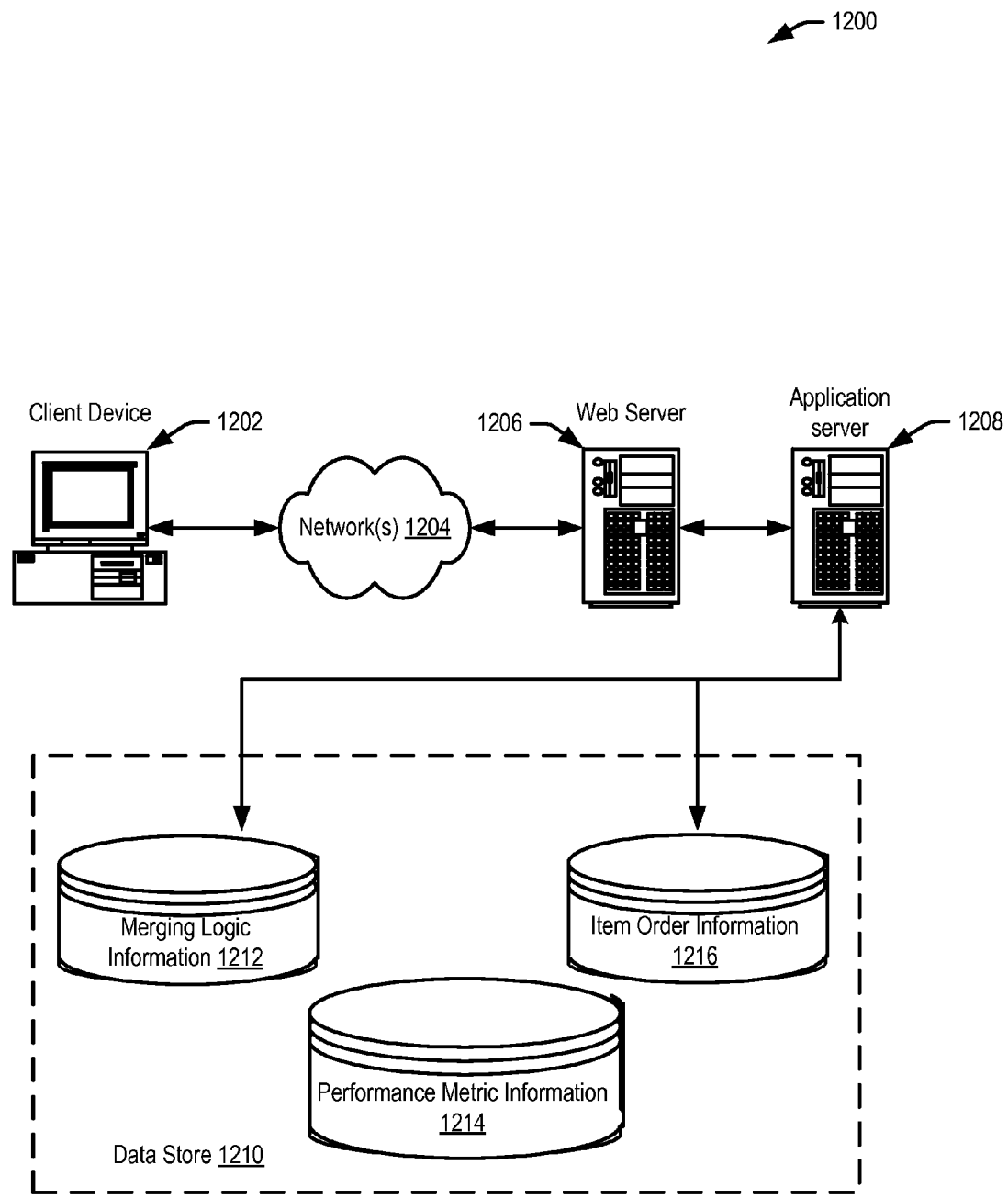
FIG. 12 illustrates an environment in which various features of the inventory management system can be implemented, in accordance with at least one embodiment.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing information which can be used by modules described herein, such as merging logic information 1212, performance metric information 1214, and/or item order information 1216. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
    a plurality of containers, each configured to receive one or more items;
    a plurality of container holders arranged within an area of a workspace, each of the plurality of container holders including one or more containers;
    a plurality of unmanned mobile drive units, each unmanned mobile drive unit configured to move a container holder of the plurality of container holders within the workspace; and
    an item pick station within the workspace, the item pick station comprising:
        an elevator assembly comprising:
            a vertical reciprocating conveyor (VRC) configured to receive one or more containers; and
            an elevator shaft configured to allow movement of the VRC within the elevator assembly;
        a two tier container staging area;
        an inbound conveyor lane configured to receive an empty container, of the one or more containers, from the VRC and move the empty container from the VRC to the two tier container staging area, the inbound conveyor lane operatively connected with the VRC; and
        an outbound conveyor lane configured to move a fulfilled container, of the one or more containers, from the two tier container staging area to the VRC, the fulfilled container including at least one item of the one or more items, the outbound conveyor lane operatively connected with the VRC,
        wherein the two tier container staging area comprises:
            an upper tier of the two tier container staging area configured to receive empty containers of the plurality of containers from the inbound conveyor lane;
            a lower tier of the two tier container staging area configured to receive empty containers transferred from the upper tier by an operator associated with the item pick station;
            an accumulation area that is connected to the lower tier and configured to temporarily store fulfilled containers for subsequent movement to the outbound conveyor lane; and
        a management module configured to:
            instruct movement, by the unmanned mobile drive unit, of the container holder from the area of the workspace to the item pick station;
            instruct removal of an item from the one or more containers of the container holder and placement of the item in an empty container within one of the upper tier or lower tier, thereby resulting in the empty container becoming the fulfilled container;
            instruct transfer of the fulfilled container from the one of the upper tier or the lower tier to the accumulation area; and
            instruct release of the fulfilled container to the outbound conveyor lane.

2. The system of claim 1, further comprising a second item pick station comprising a second two tier container staging area that is configured to share and utilize at least one of the elevator assembly, the inbound conveyor lane, the outbound conveyor lane, or the management module.

3. The system of claim 1, wherein the elevator assembly and the inbound conveyor lane are configured to receive fulfilled containers and provide the fulfilled containers to the two tier container staging area and the outbound conveyor lane is configured to move the empty containers from the two tier container staging area to the VRC, wherein the management module is further configured to instruct removal of items from fulfilled containers at the two tier container staging area and placement of the items in the one or more containers of the container holder upon receiving an indication from the workspace.

4. The system of claim 1, wherein the outbound conveyor lane is coupled with a processing trunk line that moves the fulfilled container to another area of the workspace.

5. The system of claim 1, wherein the accumulation area includes a lock mechanism coupled to an actuator, the lock mechanism configured to release the fulfilled containers to the outbound conveyor lane upon receiving instructions from the management module, the lock mechanism including at least one of a pneumatic obstruction lock, a swivel arm configuration lock, or conveyor wheels.

6. An inventory management system, comprising:
an inventory transfer station within an area of a workspace, the inventory transfer station comprising:
a bi-directional conveyor lane;
a container staging area; and
an elevator assembly comprising:
a vertical reciprocating conveyor (VRC) configured to receive containers from and transfer containers to the bi-directional conveyor lane,
wherein the bi-directional conveyor lane is configured to transfer empty containers from the VRC to the container staging area and transfer fulfilled containers from the container staging area to the VRC, the fulfilled containers including at least one item, and
wherein the container staging area comprises:
a container flow lane configured to receive the empty containers from the bi-directional conveyor lane and, in response to placement of an item in an empty container by an operator, transfer the fulfilled container to an accumulation area;
the accumulation area coupled to the container flow lane and configured to temporarily store the fulfilled containers for subsequent transfer to the bi-directional conveyor lane upon receiving instructions from a management module; and
the management module configured to:
instruct placement of a particular item in the empty container within the container flow lane;
instruct transfer of the fulfilled container from the container flow lane to the accumulation area; and
instruct transfer of the fulfilled container from the accumulation area to the bi-directional conveyor lane.

7. The system of claim 6, further comprising a second inventory transfer station comprising a second container staging area that includes a second container flow lane and a second accumulation area, the second container staging area configured to share and utilize at least one of the elevator assembly, the bi-directional conveyor lane, or the management module.

8. The system of claim 6, wherein the bi-directional conveyor lane is further configured to transfer the fulfilled containers from the VRC to the container staging area and transfer the empty containers to the VRC from the container staging area, wherein the management module is further configured to instruct removal of items from the fulfilled containers at the container staging area.

9. The system of claim 7, wherein the inventory transfer station within the area of the workspace includes a first floor of the workspace, the second inventory transfer station residing within a second area of the workspace that includes a second floor of the workspace, the elevator assembly shared between the inventory transfer station and the second inventory transfer station and further configured to receive and transfer the containers to the bi-directional conveyor lane of the inventory transfer station on the first floor and the second inventory transfer station on the second floor.

10. The system of claim 9, wherein the inventory transfer station of the first floor of the workspace is configured to place items in the empty containers and the second inventory transfer station of the second floor of the workspace is configured to remove items from the fulfilled containers.

11. The system of claim 9, wherein the inventory transfer station of the first floor can be updated from placing items in the empty containers to removing items from the fulfilled containers upon receiving instructions from the management module, the instructions generated based at least in part on an indication that the second inventory transfer station of the second floor of the workspace has malfunctioned.

12. The system of claim 6, wherein the bi-directional conveyor lane is further configured to transfer the fulfilled container to another area of the workspace via at least one of a directionally declining chute or a directionally inclining trunk conveyor line.

13. The system of claim 6, wherein the bi-directional conveyor lane utilizes a sequencing belt that is coupled with a variable control drive, the management module further configured to increase or decrease conveyor lane speed for the bi-directional conveyor lane via the variable control drive based at least in part on received customer orders for one or more items in the fulfilled containers.

14. An inventory management system, comprising:
an inventory transfer station within a first area of a workspace, the inventory transfer station comprising:
a bi-directional conveyor lane; and
a vertical reciprocating conveyor (VRC) configured to receive and transfer containers to the bi-directional conveyor lane, the bi-directional conveyor lane configured to transfer empty containers, of the containers, from the VRC to a container staging area and transfer fulfilled containers, of the containers, from the container staging area to the VRC, the fulfilled containers including at least one item,
wherein the container staging area comprises:
a container flow lane configured to store the empty containers received from the bi-directional conveyor lane; and
an accumulation area coupled to the container flow lane and configured to temporarily store the fulfilled containers and transfer the fulfilled containers to the bi-directional conveyor lane upon receiving instructions from a management module,
wherein the management module is configured to:
instruct a mobile drive unit to move a container holder from a second area within the workspace to the inventory transfer station, the container holder including one or more containers of a plurality of containers, an individual container configured to receive and store one or more items;

instruct transfer of an empty container to the container flow lane via the bi-directional conveyor lane;

instruct removal of an item, by an operator, from a particular container within the container holder at the inventory transfer station and placement of the item, by the operator, into the empty container in the container flow lane thereby creating a fulfilled container;

instruct transfer of the fulfilled container to the accumulation area, the accumulation area including a lock mechanism coupled to an actuator, the lock mechanism configured to prevent transfer of the fulfilled containers to the bi-directional conveyor lane until instructions are received; and instruct, via the actuator and the lock mechanism of the accumulation area, transfer of the fulfilled container from the accumulation area to the bi-directional conveyor lane.

15. The system of claim 14, wherein instructing transfer of the fulfilled container to the accumulation area, by the management module, includes sending a signal to a motorized section of rollers that are coupled to at least one of the container flow lane or the accumulation area.

16. The system of claim 14, wherein the management module is further configured to instruct transfer of the empty containers from a container de-stacker to the VRC, the container de-stacker configured to single out the empty container from the empty containers, a rate of singling out the empty container from the empty containers being updated based at least in part on operator throughput metrics that are maintained by the management module.

17. The system of claim 14, wherein instructing removal of the item from the particular container within the container holder at the inventory transfer station and placement of the item into the empty container in the container flow lane includes providing instructions to a robotic or automated manipulator associated with the inventory transfer station.

18. The system of claim 14, wherein the empty container includes an image based scanning identifier that is unique for each container.

19. The system of claim 18, wherein the management module is further configured to instruct scanning of the image based scanning identifier of the empty container by a user device at the inventory transfer station as the empty container is transferred to the container flow lane via the bi-directional conveyor lane.

20. The system of claim 19, wherein the management module is further configured to associate a customer order with the empty container based at least in part on information associated with the customer order and the image based scanning identifier of the scanned empty container.

* * * * *